(12) United States Patent
Einat

(10) Patent No.: US 12,433,482 B2
(45) Date of Patent: Oct. 7, 2025

(54) MULTI-MODAL DIAGNOSTIC DEVICE AND DATABASE SERVICE FOR OPHTHALMOLOGY AND NEUROLOGY

(71) Applicant: Ronen Einat, Shoham (IL)

(72) Inventor: Ronen Einat, Shoham (IL)

( * ) Notice: Subject to any disclaimer, the term of this patent is extended or adjusted under 35 U.S.C. 154(b) by 0 days.

(21) Appl. No.: 18/726,398

(22) PCT Filed: Jan. 3, 2023

(86) PCT No.: PCT/IB2023/050035
§ 371 (c)(1),
(2) Date: Jul. 2, 2024

(87) PCT Pub. No.: WO2023/126910
PCT Pub. Date: Jul. 6, 2023

(65) Prior Publication Data
US 2025/0049315 A1    Feb. 13, 2025

Related U.S. Application Data

(60) Provisional application No. 63/266,360, filed on Jan. 3, 2022.

(51) Int. Cl.
| | |
|---|---|
| *A61B 3/10* | (2006.01) |
| *G16H 30/20* | (2018.01) |
| *G16H 30/40* | (2018.01) |
| *G16H 40/63* | (2018.01) |
| *G16H 40/67* | (2018.01) |
| *G16H 50/20* | (2018.01) |
| *G16H 50/30* | (2018.01) |
| *G16H 50/50* | (2018.01) |

(52) U.S. Cl.
CPC .............. *A61B 3/102* (2013.01); *G16H 30/20* (2018.01); *G16H 30/40* (2018.01); *G16H 40/63* (2018.01); *G16H 40/67* (2018.01); *G16H 50/20* (2018.01); *G16H 50/30* (2018.01); *G16H 50/50* (2018.01)

(58) Field of Classification Search
CPC ........ A61B 3/102; G16H 30/20; G16H 30/40; G16H 40/63; G16H 40/67; G16H 50/20; G16H 50/30; G16H 50/50
See application file for complete search history.

(56) References Cited

U.S. PATENT DOCUMENTS

| | | | |
|---|---|---|---|
| 9,029,801 B2 | 5/2015 | Yves | |
| 2004/0061867 A1* | 4/2004 | Dubois | ............... G01B 9/02069 356/497 |
| 2005/0018201 A1 | 1/2005 | de Boer et al. | |
| 2005/0254061 A1 | 11/2005 | Alphonse | |
| 2013/0338495 A1 | 12/2013 | Feldman et al. | |
| 2014/0160486 A1 | 6/2014 | Kang et al. | |
| 2016/0356718 A1 | 12/2016 | Yoon et al. | |
| 2018/0120550 A1* | 5/2018 | Boccara | ............. G01N 21/4795 |
| 2019/0391010 A1 | 12/2019 | Thurston et al. | |
| 2023/0194427 A1* | 6/2023 | Alexandros | ........ G01N 21/6456 250/459.1 |

FOREIGN PATENT DOCUMENTS

WO   2022008715 A1   1/2022

* cited by examiner

*Primary Examiner* — Nay A Maung
*Assistant Examiner* — Jose M Torres
(74) *Attorney, Agent, or Firm* — Reches Patents

(57) ABSTRACT

A robust, accurate and cost effective systems and method for measuring a sample. The method may include optical coherence tomography and/or a determining of fluorescence information.

38 Claims, 17 Drawing Sheets

MULTI-MODAL DIAGNOSTIC DEVICE AND DATABASE SERVICE FOR OPHTHALMOLOGY AND NEUROLOGY

CROSS REFERENCE

This application claims priority from U.S. provisional patent Ser. No. 63/266,360 filing date Jan. 3, 2021, which is incorporated herein by reference.

BACKGROUND

In the field of optical imaging systems there are large variety of modalities, most of these devices are predominantly using one modality or few types of inspection with some variation among the modalities, for example a microscope that changes the illumination angle or wavelength between modalities. One method, named: Optical Coherence Tomography (OCT) is a method for 3D reconstruction of transparent samples and/or topographic characterization of a surface. The OCT method is based on interference of electro-magnetic waves on a detector surface.

For Ophthalmology the eye posterior and anterior diagnostics OCT has become a mandatory diagnostic tool as its capable to detect sub-surface abnormalities that regular imaging methods do not. Current commercial OCT devices in this field are expensive and have large form factor that requires a separate space in the clinic with dedicated desk and in many times need an operator to capture the data.

There is a need to provide a simple, low-cost and small form-factor OCT to enable vast scale usage of OCT commercially and to enable simple and affordable adding of additional imaging modalities using the same imaging optics.

A list of references is provided below:

REFERENCES

[1] Optical coherence tomography: fundamental principles, instrumental designs and biomedical applications. D. P. Popescu, Lin. P. Choo-Smith, C Flueraru, Y. Mao, S. Chang, J. Disano, S. Sherif, M. G. Sowa. Biophys Rev (2011) 3:155-169DOI 10.1007/s12551-011-0054-7.
[2] En face optical coherence tomography: a technology review. Vol. 10, No. 5| 1 May 2019| BIOMEDICAL OPTICS EXPRESS 2177. R. A. Leitgeb. https://doi.org/10.1364/BOE.10.002177.
[3] Common approach for compensation of axial motion artifacts in swept-source OCT and dispersion in Fourier-domain OCT. Dierck Hillmann, Tim Bonin, Christian L" uhrs, Gesa Franke, Martin Hagen-Eggert, Peter Koch, and Gereon H"uttmann. 2012 OSA 12 March 2012/Vol. 20, No. 6/OPTICS EXPRESS 6761. https://www.osapublishing.org/oe/fulltext.cfm?uri=oe-20-6-6761&id=230221
[4] Ultrahigh-Resolution Full-Field Optical Coherence Tomography. Arnaud Dubois, Kate Grieve, Gael Moneron, Romain Lecaque, Laurent Vabre, and Claude Boccara. APPLIED OPTICS/Vol. 43, No. 14/10 May 2004.
[5] Swanson et al (1992)
[6] Fixational eye movements and perception. Michele Rucc, Paul V. McGraw, Richard J. Krauzlis. Vision Research, Volume 118, January 2016, Pages 1-4.
[7] View of What makes a microsaccade? A review of 70 years research prompts a new detection method (unibe.ch). Anna-Katharina Hauperich, Laura K. Young, Hannah E. Smithson. Journal of Eye Movement Research. 12(6):13.
[8] Patent US 2021/0018311 A1. INTERFEROMETRY WITH PULSE BROADENED DIODE LASER. Alexandre R. TUMLINSON; Nathan, SHEMONSKI, San Francisco; Yuan LIU.
[9] Fluorescence Lifetime Imaging Ophthalmoscopy (FLIO) of Macular Pigment. Chantal Dysli, Sebastian Wolf, Mikhail Y. Berezin, *Lydia* Sauer, Martin Hammer, Martin S. Zinkernagel. Progress in Retinal and Eye Research, Volume 60, September 2017, Pages 120-143.
[10] Fluorescence Lifetime Imaging Ophthalmoscopy (FLIO) of Macular Pigment. *Lydia* Sauer, Karl M. Andersen, Binxing Li, Rebekah H. Gensure, Martin Hammer, and Paul S. Bernstein. Invest Ophthalmol Vis Sci. 2018 June; 59 (7): 3094-3103.
[11] Retinal changes in Alzheimer's disease—integrated prospects of imaging, functional and molecular advances; Veer B.Gupta, NitinChitranshi, Jurre den Haan, Mehdi Mirzaei, Yuyi You, Jeremiah K H. Lim, Devaraj Basavarajappa, Angela Godinez, Silvia Di Angelantonio, Perminder Sachdev, Ghasem H. Salekdeh, Femke Bouwman, Stuart Graham, VivekGupta. Progress in Retinal and Eye Research Volume 82, May 2021, 100899; https://www-.sciencedirect.com/science/article/pii/S1350946220300719.
[12] Near infrared spectroscopy in the diagnosis of Alzheimer's disease. Hock C, Villringer K, Müller-Spahn F, Hofmann M, Schuh-Hofer S, Heekeren H, Wenzel R, Dirnagl U, Villringer A. Ann N Y Acad Sci. 1996 Jan. 17; 777:22-9. doi: 10.1111/j.1749-6632.1996.tb34397.x. PMID: 8624087. https://nyaspubs.onlinelibrary.wiley.com/doi/abs/10.1111/j.1749-6632.1996.tb34397.x,
[13] Twenty-five years of optical coherence tomography: the paradigm shift in sensitivity and speed provided by Fourier domain OCT. Johannes F. DE Bore, Rainer Leitgeb and Maciej Wojtkowski. Biomedical Optics Express 3248 Vol. 8, No. 7, 1 Jul. 2017.
[14] Off-axis reference beam for full-field swept-source OCT and holoscopy. D. Hillmann, H. Spahr, H. Sudkamp, C. Hain, L. Hinkel, G. Franke, and G. Hüttmann, Opt.Express 25 (22), 27770-27784 (2017). http://dx.doi.org/10.1364/OE.25.027770.
[15] Kilohertz retinal FF-SS-OCT and flood imaging with hardware-based adaptive optics. Denise Valente, Kari V. Vienola, Robert J. Zawadzki, and Ravi S. Jonnal. Biomedical Optics Express Vol. 11, Issue 10, pp. 5995-6011. https://doi.org/10.1364/BOE.403509.
[16] Wide-field TCSPC: methods and applications. Liisa M Hirvonen and Klaus Suhling. Measurement Science and Technology, 28 (2017) 012003. https://iopscience.iop.org/article/10.1088/1361-6501/28/1/012003
[17] A method and active pixel array for a time-of-flight detection. Patent WO2021255743A1. By Eyal Yatskan and Uri Baror.

SUMMARY

There are provided methods, devices and non-transitory computer readable medium for evaluating samples.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
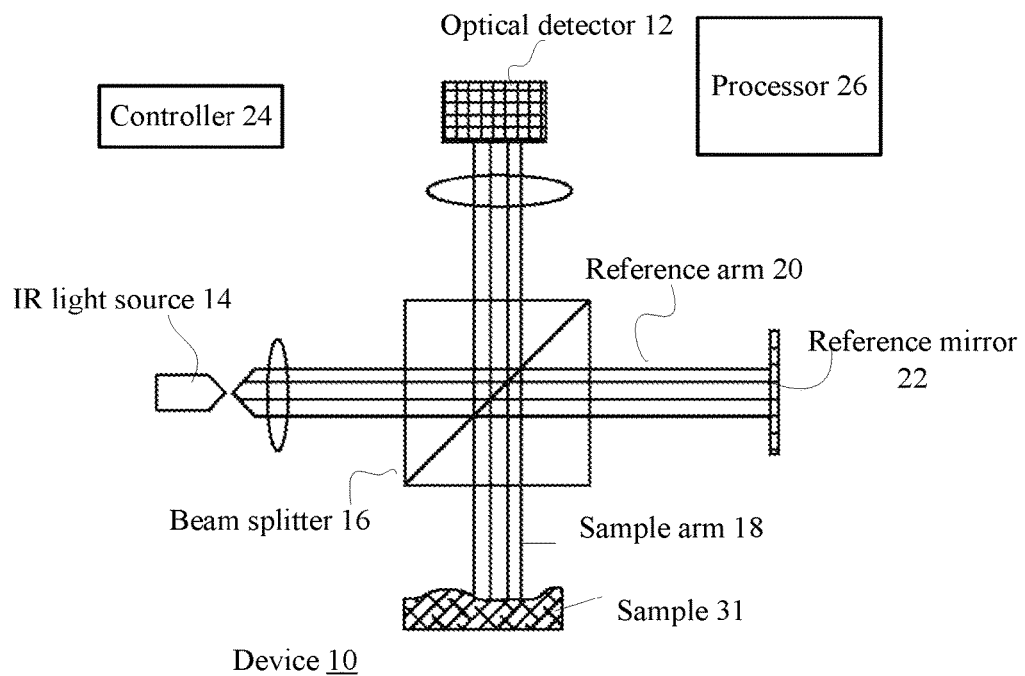
FIG. 1 is an example of a device for OCT.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent.

Numerous specific details are set forth in the following description to provide a thorough understanding of the invention. However, the invention may be practiced according to the claims without some or all these specific details. To clarity, technical material that is known in the technical fields related to the invention has not been described in detail so that the invention is not unnecessarily obscured.

Reconstruction of transparent samples and/or topographic characterization of a surface. The OCT method is based of interference of electro-magnetic waves on a detector surface. An OCT device includes an interferometer and a broadband wavelength light source featuring short coherence length. The light source beam is split to 2 arms, typically using a beam-splitter, where one arm passes the light onto a reference surface while the other arm projects the light on the sampled object. The back-reflected light from both the reference and sample arms are interfered at the detector surface. Light within the coherence length of both rams would interfere between one another. This interference of light enable reflectivity vs depth mapping to be obtained. OCT interferometry devices usually provide this depth mapping over an area of the inspected sample, that is 3D mapping. The scanning method over sample area may be a beam scan of a small spot over the inspected surface with single detector using 2D steering optics, such as a rotating mirror that move the spot over the area in a raster line sequence, another scan method use line field with line sensor array, using a 1D rotating mirror or other type of beam steering method for the purpose of covering the sample area. Full field imaging technic does not need for any steering as the inspected area imaged on a 2d senor array where however due some reasons, described below, isn't being used for commercial OCT.

Further to the OCT, most common sample review modes are a white-light source illumination combined with 2D RGB sensor array. Various other imaging modalities exist such as spectroscopy, fluorescence, and polarization. All are obtained by light manipulations using filters, polarizers, and other kinds of light manipulations along with a 2D sensor.

Commercial devices typically not offering both OCT and visible imaging due to the difference between capture modes (scan vs 2d imaging). There are some devices that are having this offering however they employ different internal optics for the different modalities. As a result, these devices are large and expensive.

There are provided some Full Field OCT (FF-OCT) methods with simplified components, diffraction limited resolution, shot noise limited SNR and unbounded depth range. The imaging optics can have multiple use for OCT and other imaging modalities such as spectroscopy, fluorescence, polarization and others. Giving rise for low-cost small form factor device. There are some prior arts for methods comprising Full-Field OCT that utilize field illumination and imaging optics, some are not fit for in-vivo testing, some having complexity and/or price disadvantages. A Time-Domain Full Field OCT (FF-TD-OCT) example was provided with shot-noise limited signal quality, using a phase modulator. A major disadvantage of this work was the use of 4 scanning sweeps for the complete demodulation of the signal to get the interference modulation information. The reference light path was modulated by a phase modulator at high frequency that produces the interference modulation. The light source was flashed with pulses of light with the same frequency for ¼ cycle time different phases. The phase modulation combined with synchronized light flashes results that the sensor collecting light only at flash time during its exposure time. Complete modulation characteristic measurements 4 different phases used between the light source and phase modulation, utilizing 4 different scans of the sample. For a stationery sample this method is adequate. However, for live a moving sample it would pose noise to the modulation amplitude measurement as each scan differs from one another due to motion of the sample vs the sampling system.

A Swept-Source Full field OCT (FF-SS-OCT) was provided, utilizing Adaptive Optics (AO) for aberration correction, claiming for high resolution image quality over diluted eye, in vivo scanning. The configuration utilizes a Swept Source and field imaging and the use of fast capture sensor at very high rate. The high spatial resolution obtained with high NA optics exhibit low DOF thus offering depth data only over optics DOF. This will be further discussed below. Also, the swept source is an expensive component. Contributing to overall higher size and price.

Specifically for ophthalmology the OCT analysis has become crucial tool for eye diagnostics, its ability to generate a 3d mapping of the retina enable diagnosis of eye diseases that are not shown with regular imaging methods. The OCT provides information about retina layers, with good layer separation and abnormalities detection for most popular diseases such as Age-related Macular Degeneration (AMD) Gloucoma and others. OCT also is use for Diabetic retinopathy detection and tracking, Diabetic patients are regularly being monitored with OCT for detection of signs of retinal deterioration.

Eye review, especially the retina, is becoming relevant for neurology as the eye is part of the brain neurology. Research frontline has shown indication that the retina is affected from neural degradation of dementia patients in parallel to the brain and retinal inspection can provide bio-indication for the early start of dementia diseases such as Alzheimer Disease (AD) This research branch is growing and expected to yield the need for wide distribution of retinal imaging devices with multi-modal capabilities, including OCT. Many eye diseases such as Age-related Macular Degeneration (AMD), Glaucoma and diabetic retinopathy are chronic so there is a need for regular monitoring of patients for years, same as the need to monitor people for neurodegeneration and diabetic retinopathy signs as early as possible for treatments and tracking of the disease progress over time that will provide feedback of treatments. Given the growth of population and increasing numbers of dementia disease it's clear the need for large distribution of sample device availability to the populations. In addition, the data captured of the devices may become huge and need to be handled adequately to enable review, remote diagnosis, auto-diagnosis and new diagnosis development.

FIG. 1 illustrates an example of an OCT device 10 that evaluated sample 31. A broadband light source beam (from IR light source 14) is split by a beam splitter 16 into sample arm 18 and reference arm 20 (terminated at reference mirror 22), reflected light from both arms interfere on the detector 12 surface via the beam splitter. The OCT device has a controller 24 and a processor 26.

There are various methods for OCT implementation. Time Domain OCT (TD-OCT) uses a wideband light source with short coherence length. In this mode the reference optical path length is typically modified by motion of a reference mirror. This motion changes the depth of the coherence window such that for each length results an interference with different depth of the sample. This way the movement of the reference mirror can be used to scan the desired depth range. The first OCT systems used this method to 3d reconstruction of a sample reflectance over depth. The scan over depth called "A-Scan". These first devices used a fast-moving mirror to complete A-Scans over the sample at certain point illuminated by small spot of the light. After the first A-scan, the spot moved laterally (or the sample is being moved) to next nearby location where next A-Scan is being performed. This way a 2d area can be scanned for 3d reflectance mapping. The fast motion of the reference arm during A-scans modulates the interference pattern over the detector surface such that the detector circuit measures it's modulation amplitude in a frequency related to the motion velocity of the reference mirror. The temporal modulation amplitude in each time/position gives the sample reflectance in each depth. If a sample is with high reflectivity the returned optical electric field on the detector surface is high, thus the interference modulation amplitude would be high. Similarly low reflectance from the sample in a position corresponding to the reference arm path length will result low modulation amplitude during scan motion. Spectral Domain OCT (SD-OCT) evolves from the Time-Domain OCT where the light source broadband is being used to replace the TD moving arm. The broadband light is being split to wavelength sections, using a grating or a prism prior to the detector, where each detector is sensitive to a different range of wavelengths. The set of signals obtained from the different wavelength sections passes a furrier transform to result the desired reflectance over the whole depth range. This method replaces the need for fast moving reference mirror. The SD-OCT method is commonly quoted as improving signal quality by 1 to 2 orders of magnitude while increasing throughput. Another method for Spectral Domain OCT, is Swept-Source OCT (SS-OCT) in this case the light source changing its center wavelength as function of time. Thus, the split to spectral slices is done over time instead of spectral split in space. SS-OCT also requires Fourier transform to get the depth data.

OCT tools typically generate a 3d mapping of a region of the observed sample, that is the 3d mapping is done over lateral region, the depth axis is called "Axial" and the lateral directions are transverse axes. The axial resolution determined by the light source spectral band given by:

$$D_z = \frac{2\ln 2 \lambda_0^2}{\pi \Delta \lambda} \quad (1)$$

The transverse resolution is determined by the optical resolution of the detection optics. There are few options for performing the xyz scanning, where z- is axial, x and y are lateral (transversal) scanning. In many cases the scanning of the surface is obtained by single spot scan into single detector where a 2d mirror steer the beam of light to scan the spot laterally over the sample. In each position an axial scan is done, one after the other.

There is provided a low-cost edge device, enabling widespread distribution for capturing retina or a sample imaging with various modalities using a single 2d sensor. The devices can be a part a system for storage, share, developments and many more services described below.

Another embodiment extends the imaging capturing device to include other biosensors such as EEG of the brain to contribute additional complementary data to further enhance detection specificity and sensitivity.

There is provided a low-cost edge device, enabling widespread distribution for capturing retina or a sample imaging with various modalities using a single 2d sensor. The devices can be a part a system for storage, share, developments and many more services described below.

There is provided a device performing multi-modal sensing capabilities, comprising high quality OCT and various other imaging modalities using the same imaging optics. The device can be widespread distribution and cloud-based data collection from the distributed devices for multi-sensor fusion, data mining, sharing, diagnosis and AI-based diagnostics development.

There is provided a OCT mode that enable Full-Field (FF) imaging. Meaning the capture of 3D data obtained by a series of 2D images of full-field imaging using 2D sensor array. The term "full-field" relates to 2D field imaging onto 2D sensor array without scanning with beam steering.

Regarding OCT implementation there are 2 main methods. Time Domain OCT (TD-OCT), and Spectral Domain OCT (SD-OCT) also commonly named Fourier Domain OCT (FD-OCT). There are some advantages for each method. The SD-OCT has a better SNR, and historically improved scanning throughput since it eliminates the need for fast axial scanning mirror in the reference arm. However, in the case of FF-OCT using time-domain imaging the motion of the reference mirror can be slow as it scans all image at once over depth, thus the fast axial scanning not needed. If one desires FF imaging for cost and simplicity reasons than SD-OCT would need to be designed with Swept Source (SS) illumination, since it's difficult to implement with broadband illumination and grating/prism+FF. The SS is a light source that have single wavelength at a time and the wavelength changes along time, where the 2D sensor captures the signal wavelength in time, hence called swept source. Each capture of different wavelength. The SD-OCT and SS-OCT also have some disadvantages such as dispersion, fall off, auto-correlation noise and the need to perform a Fourier transform over the data to obtain depth info. In the below description it will be discussed in more detail.

Further modalities can be spectroscopy or fluorescence using illumination at one wavelength and receiving images at another wavelength, depending on desired sampled feature. The fluorescence capture implemented using filters both at the illumination and the collection, another option is to use narrow wavelength illumination light source and a blocking filter in the receive channel to block out the illumination and receive the other wavelengths due to fluorescence.

Additional modalities that can be implemented are Fluorescence Lifetime Imaging Ophthalmoscopy (FILO) or Fluorescence Lifetime Imaging Microscopy (FILM). As the emitted fluorescence light decay time of biological matter contains important information of the concentrations and type of molecules contained. Moreover, the decay time may exhibit 2 or more profiles that are very important for material distinguishing as each material have different decay time. In this invention we utilize the multi-node sensor fast switching time+a sequence of phased capture to produce decay profile that will enable FLIM or FLIO of at least 2 time constants using the same imaging optics. Along with fast pulses activation illumination sync' with the sensor detection phases.

An imaging device with multi-modalities using the same imaging optic path provide the following advantages:
a. Simple and cost-effective design.
b. Easy usability, fast capture. Once in alignment with the sample, all modalities can be activated for capturing. No need for sample capture using multiple devices
c. Smaller form factor, small device.
d. Alignment between modalities that simplify sensor fusion diagnostics, since the same imaging optics used for all capture modalities, features captured by all modalities are aligned accurately one to the other, providing powerful diagnostic information for further analysis of the inspected surface. The only difference might be due to chromatic aberrations.

The device further has a processing unit for data analysis, feature fusion algorithms between the various modalities, diagnostics detection. A synchronization and control logic to activate the modes without interfere one another. Also having a connection with a computer for transfer of data and results to the main computer.

Device wide distribution in the populations will also enable wide data collection in a cloud or dedicated database storage. For sharing, tracking over time, and research analysis and development of new diagnostics.

Swept Source FF-OCT:

There may be provided a Swept Source FF-OCT (FF-SS-OCT), as described above, the wavelength of light is swept during exposure and capture sequence, such that at each time the light source would emit a single wavelength, thus each detector exposure would accumulate charge from one specific wavelength. Subsequent exposures capture different wavelengths, this way spectral split into ranges obtained via the time variant wavelengths change where SD-OCT use spectral split of a broadband light source using a grating or a prism. Since the illumination wavelength changes in time, it is possible to implement full field imaging. SS-OCT is a kind of FT-OCT, where the data captured over spectral slices need to pass Fourier transform. SS instantaneous band is narrow, thus obtaining wide coherence length and enable wide depth ranging.

Figure 2:
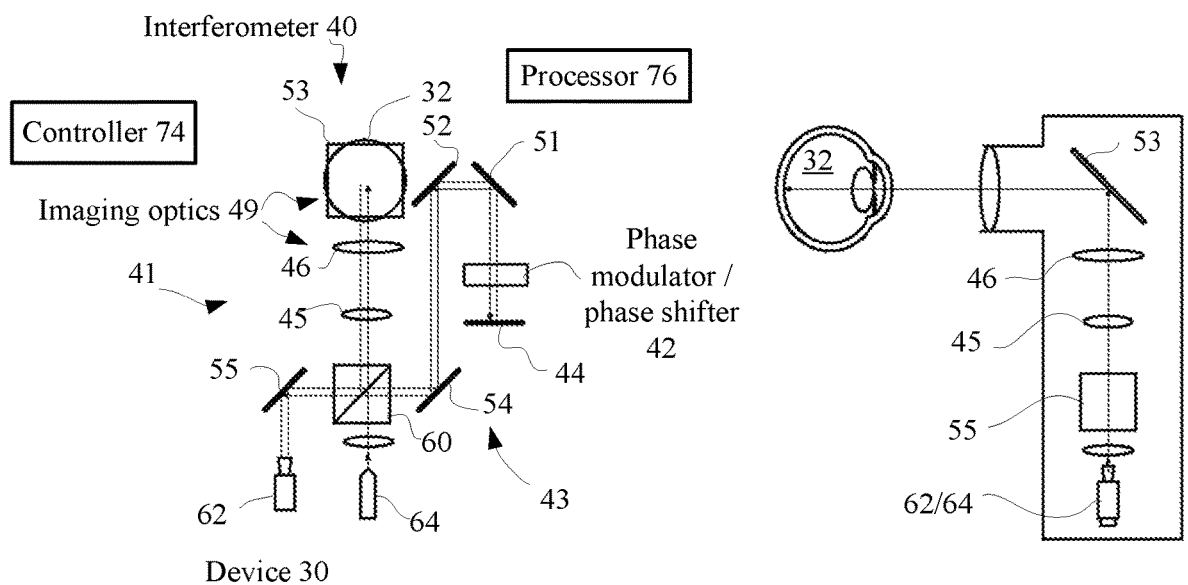
FIG. 2 is an example of a device for OCT.

FIG. 2 illustrates the basic FF-OCT device of an embodiment. Both SS and TD configurations presented. The device optical path is folded to provide thin device width. The figure depicts a plausible implementation for Ophthalmology where the eye retina is being reviewed. For the SS case, the image capture sequence contains a series of exposures of the 2D sensor that may be a global shutter CMOS sensor, each exposure is in synchronization with illumination flash of the swept source. Exposure is typically followed by a read-out time from the sensor to the processing platform, during read-out light can be switched off. At the proceeding exposures the illumination wavelength swept over range of entire spectral bandwidth. Some sensors feature parallel exposure and readout, where during the exposure time of the one image the previous exposure data is sent to the platform, this enables to increase the active duty cycle thus reduce scan time. A series of images are being collected. It should be noticed that the wavelength value can be sequential per capture from low to high or vice versa, but it can also be arbitrary arranged with non-constant step size between flashes.

FIG. 2 illustrates an FF-OCT device 30 (denoted device 30) and a sample such as eye 32. The device includes radiation source 62, sensing unit 64, beam splitter 60, interferometer 40 that has sensing arm 41 and reference arm 43, phase modulator or phase shifter 42 (shown in the reference arm but may be located in the sensing arm), tuneable focusing optics 45, imaging optics 49 that includes lens 46 and folding mirror 53, reference mirror 44, and additional reflecting mirrors 51, 52, 54 and 55. The radiation source 62 may be a swept source or a broadband source. The sensing unit 62 may include one or more 2D arrays of sensing related elements. Controller 74 controls the device. Processor 76 may receive detection signals and process them. FIG. 2 includes a detailed front view (left side of FIG. 2) and a side view that illustrates only some of the optical components of device 30.

Dispersion and Motion Artifacts.

Spectral Domain OCT is very sensitive to axial errors as they are magnified by a factor of $\lambda_0/\Delta\lambda$ that can be as high as 10-20 . . . . Thus, in cases where the optical path of the sample arm changes relative to the sample arm along wavelength change scan swipe it will result quality reduction of the depth reconstruction. Path length difference can be caused due to dispersion effect as the light passes through sample material, such as the eye fluids, and/or distance variations in time due to mechanical vibrations. Below we describe the causes and their resolutions.

Dispersion: The dispersion relates to the change of the refractive index of the sample as a function of wavelength. A biological sample such as the eye causes the optical path length to change due to refractive index change in the cornea, lens, and eye fluid. As a result, the obtained depth mapping after Fourier transformation is distorted since the reference optical path does not have the same optical path over wavelength as the sample arm.

Motion Jitters: Another cause for signal quality degradation is motion vibrations between the device and the sample as the sample might not be tightly fixed to the device there may be micro-vibrations that change the optical path length during the scan. This change, like dispersion causes quality degradation. During the time of scan, e.g. 1 second capture sequence, these mechanical vibrations change the optical path.

These dispersion and motion-based distortion can be compensated; however, we need the exact index variation over wavelength mapping and motion details, but there may be variations sample to sample, and the vibrations are not known at the time of capture. It was shown that the effect of difference of the optical path between the ref arm and the sample arm, dispersion, vibrations or other cause can be characterized as a phase delay to the interference correlation function that is $e^{-ikf(*)}$ where $f(k,t)$ is the residual phase delay from zero delay at the scan start and k is the wavenumber and t is time from start of scan. Thus, compensating the effect can be done by multiplying the data samples by its complex conjugate $e^{ikf(*)}$. There are several approaches in the literature for performing this compensation. Below described compensation optimization method for contrast enhancement. For simplicity we assume no lateral jitters during scan, that is the pixel $(x_0, y_0)$ represent the signal obtained of a small area on the sample where this area is constant during scan.

The dispersion and motion-based distortion effect may be separated from the data itself by means of parametrical modelling of the variations using contrast enhancement methods by the following:

$$R(x_0, y_0, z) \propto \mathcal{F}\{S(x_0, y_0, l_i)\}; \quad (2)$$

$$C(x_0, y_0) = \underset{over\ z}{\text{Contrast}}(R(x_0, y_0, z));$$

$$dispf = \max_{over\ a,b,c\ ...} \left[ \underset{over\ z}{\text{Contrast}}(\hat{R}(x_0, y_0, z)) \right] \quad (3)$$

$$\text{and}: \hat{R}(x_0, y_0, z) = \mathcal{F}^{-1}\{S(x_0, y_0, l_i) \cdot e^{ikf(l_i, a, b, c\ ...)}\} \quad (4)$$

S( ) is the normalized signal obtained in the detector at $(x_0, y_0)$ for the $\{l_i\}$ sequence of wavelength frequencies of the light source. And R( ) it's the calculated reflectance square root of a pixel located at (x,y,z) for the z depth. $\mathcal{F}^{-1}($ ) denotes the Inverse Fourier Transform (IFT) function. The term $\hat{R}(x_0, y_0, z)$ is the reflectivity mapping obtained for the enhanced contrast. The term $e^{ikf(l_i, a, b, c\ ...)}$ is the conjugate factor for dispersion and motion compensation. The function $f(l_i, a, b, c\ ...\ )$ is a model based function over $l_i$ with parameters a,b,c . . . , $f(*)$ can be a polynomial function or any other model based function that is being optimized for obtaining the best contrast over z axis. As Its expected that the best signal quality conditions would be obtained once dispersion and motion compensation is optimal. The maximization process of signal contrast is a search among the model parameters for a,b,c . . . value that will result the desired best contrast. The model type and parameters should be selected such that it will represent the dispersion and motion variation that is expected to be somewhat smooth over wavelength and continuous. Also, the model parameter numbers should be low. There are many optimization methods, as exhaustive search or heuristic such as steepest decent.

The above-described method for signal quality improvements defined for one image pixel termed $(x_0, y_0)$ ideally one should repeat this operation for all pixels in the detector array. This might be computational intense, long duration and costly. However, both dispersion and motion can be assumed common for the sample or at least for some regions so the compensation calculator for a pixel or a group of pixels may be distributed to their neighbouring pixels. This way the compensation optimization process can be done on small sample of the data but would be used to the depth reconstruction of all pixels. Averaging over group of sample pixels in each zone also helps to reduce temporal noises. The depth generation over pixel array flow is:

Split the image to G×H zones.
Per zone, select sample pixels for the optimization process.
Perform the compensation process described at eq (2), (3) & (4) above for the zone sample pixels.

Find best contrast model $f_{g,h}(l_i, a, b, c \ldots)$; $g=1 \ldots$ G, $h=1 \ldots$ H. By averaging over calculated compensations for each of the sample pixels. Another option is the average the signal of sample pixels followed by compensation calc.

Distribute the compensation model to all pixels in the image. Each model can be used to calculate depth mapping of its own zone, a better approach may be to interpolate the compensation phase between zones. Interpolation will reduce error for pixels near the borders between zones. Also, it will guarantee spatial continuation.

Fall Off Issue and Solution.

The Spectral Domain OCT splits the illumination wavelength range into slices of small spectral ranges by using a grating or prism. Each detector receives a sub-range. The effect of this range causes for degradation of contrast as the function of depth, since it's not a single wavelength. So features in proximity to reference OPL distance will have higher contrast, where the further the delta distance increases from the reference distance contrast being degraded.

This issue named "full-off" appears also at SS-OCT based systems, as the source wavelength change continuously during the temporal dada acquisition, typical spot or line field scanning methods need to sweep the wavelength range fast and continuous as the detector analog signal is being sampled in time. Such that each sample also contains a slice of spectral range.

There is provides a Full Field SS imaging in which the source wavelength changes slowly over time using discrete exposures, so it's viable to implement stepwise wavelength changes over time, in synchronization with the 2D detector array such that each exposure image capture will contain a single wavelength, or very narrow range, rather than range slice as would be the case for linear continuous wavelength sweep example.

Lateral Jitter Fix—(Eye Fixation Jitter).

During scan capture, lateral jitters may degrade imaging quality as each image capture in the 2D sensor might suffer from some miss-alignment due to lateral (transverse) jitters. As a result, the reconstructed 3D mapping might degrade contrast and sharpness. Depending on the jitter's amplitude and speed of motion. At Ophthalmology, the eye, once fixated on an object, exhibit some jitters, where its optical axis moves over time. This motion called "*Eye Fixation Jitter*" is an issue if one wants to capture an image of the retina or the exterior part of the eye. There are 3 basic types of eye motions:

1. Microsaccades, typically 2-3 times/see 20-80 arc min.
2. Optical drifts—low frequency random walk <40 Hz
3. Tourmore—High frequency random walk 40 Hz<f<100 Hz. Typically lower in amplitude vs Microsaccades and Optical drifts.

Among these 3 types, the microsaccades have highest amplitude and may introduce high smearing noise that causes contrast loss over sensor's 2D pixel array image. It was shown that a duration of ~1 ms is safe for stable capture of the eye for single exposure without these smearing effects. This is also applicable once motion jitters are considered. For FF-OCT case, where the scan process includes multiple exposures, these jitters might drastically affect image integrity, as the different images would not have fully aligned one another. Yet having capture of multi-frames where each exposure is shorter than 1 ms the images would not suffer from blurring artifacts. However, jitters induced lateral displacements can be compensated by registration process among captured image frames. However, as explained, each image of certain depth does not contain motion artifacts even if the whole capture sequence may be 1-2 sec.

DC and Side Ambiguity Resolving

For a case transparent sample where the internal depth data is of interest the basic SS-OCT method can't resolve the ambiguity of depths on the 2 sides of the 0 (zero) OPL difference as the FT of a real signal exhibit symmetry around the center zero frequency. One way SS-OCT systems resolve this issue by using only ½ of the coherence sides. That is to set the zero OPL difference outside of the sample. This solution is undesirable for our implementation as narrows the work range and limits the possible depth range. Another way to resolve this issue by a phase modulation of the reference arm of $\pi/2$ ($\lambda/4$) cycle used.

Fourier Domain OCT is based on spectral interferometry, where recombined light from reference and sample arms is spectrally separated. The detected interference signal as function of $k(k=2\pi/\lambda)$ may be expressed by:

$$I_{cos}(k) = I_r(k) + 2\sqrt{I_s(k)I_r(k)} \sum_n \alpha_n \cos(k\,z_n) + I_s(k)$$

Where $I_r(k)$ and $I_s(k)$ represent the intensities reflected from the reference arm and the sample arm respectively. $\alpha_n$ is the square root of the sample reflectivity at depth $z_n$ where at z=0 is the sample z that is equal to reference arm OPL, the power spectra of IFT over I(k) would result ambiguous ($z_n$, $-z_n$) solution since the intensity is real number as the nature of FT. Adding a swipe over k with the addition of $\pi/2$ phase delay in the reference arm or sample arm would result:

$$I_{sin}(k) = I_r(k) + 2\sqrt{I_s(k)I_r(k)} \sum_n \alpha_n \sin(k\,z_n) + I_s(k) \quad (13)$$

The combination of $I(k)=I_{cos}(k)+iI_{sin}(k)$, where i represent the imaginary part will produce a complex representation that will result a unique $z_n$ at the inverse FT transformation. However, this requires a second set of frames to be collected with the phase shifting. Another issue is the DC component (at z=0) of the FT, as the $I_r(k)$ and $I_s(k)$ parts can't be removed, traditional SS-OCT devices utilize balanced detection that removes the DC component of the signal. Allowing only the coherence signal for the capture, another approach is to subtract the reference spectral density profile form the interference density profile.

A different approach for DC component and complex conjugate (negative z) removal proposed at the literature by use off-axis angle between the sample and reference arm optical axis towards the sensor. This angle produces spatial fringes on the sensor surface that corresponds to the off-axis angle, the wavelength and the coherence amplitude. These spatial fringes used for the DC and complex conjugate suppression. It was also shown that this method reduces autocorrelation noise (will be described below). The spatial fringe rate on the sensor surface is used by spatial or frequency filtering to extract the desired information. However, the method limits spatial work range considerably (by ~⅓) thus resolution affected and requires detection spatial response to be much higher than for on-axis method that is complex and costly.

FF-SS-OCT Full Processing Flow

Figure 3:
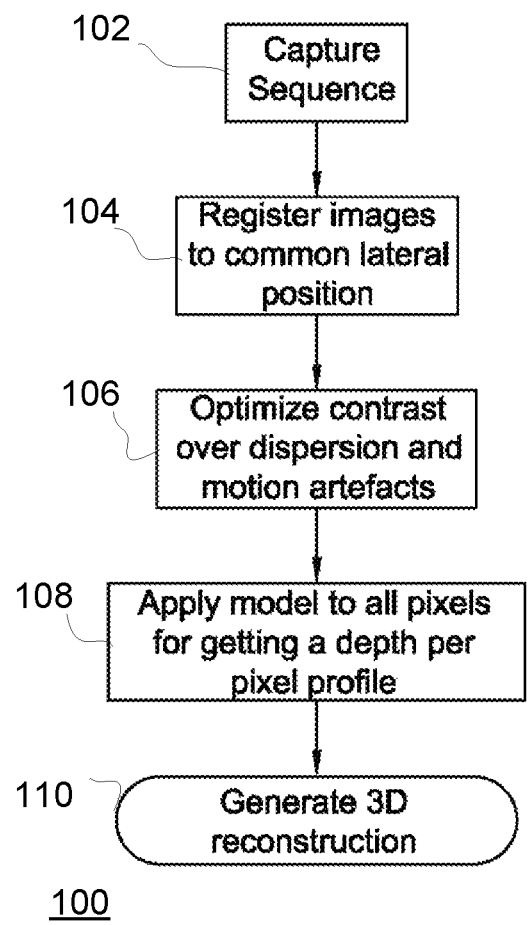
FIG. 3 is an example of a method.

Summarizing the above discussion, the processing flow 100 presented at FIG. 3 starting with a capture sequence 102 of multi-images of the sample, each image capture of short duration that would ensure no blurring due to motions of any kind. Following the capture sequence, a registration step 104 is done for laterally align the images, that would compensate the vibrations and jitters in the lateral directions (x,y), after the registration the next step is to compensate for dispersion and axial direction vibrations 106 as described above. This may be followed by step 108 of applying a model to all (or some) pixels for getting depth per pixel profile, Following that—a 3D reconstruction can be made—see step 110.

FF-SS-OCT Enhanced Resolution.

The OCT axial resolution determine largely by the spectral width of the light source as stated at eq. (1) done simply by increasing the swift range of the source, however some issues may arise such as the overall response of the sensor over the bandwidth range may not be equal over range such that it would influence the obtained reconstructed mapping, also dispersion effect more pronounce, however these issues may be resolved mathematically as known in the art and described above for dispersion compensation.

Regarding the lateral resolution. There is an inherent tradeoff between Depth of Focus (DOF) and resolution that contradict each other. The higher the spatial resolution the lower the DOF of the optical imaging system. Thus, improving the lateral resolution ultimately reduces DOF since they both relate to the optical Numerical Aperture (NA).

Diffraction limit resolution determined by:

$$\Delta x = \frac{4\lambda f}{\pi d} = 1.27 \lambda f_{\#} \quad (5)$$

Where $\lambda$ is the wavelength [m], $f$ is the focal length and d is the optical aperture diameter [m]. $F_{\#}=f/d$ is the F-Number that is inversely proportional to the NA.

The DOF determined by:

$$DOF \approx \frac{2u^2 c}{f^2} f_{\#} = \frac{2u^2 c}{fd} \quad (6)$$

Where u is the distance to subject [m], c is circle of confusion [m]. Increasing the aperture d increases the lateral transverse resolution but reduces the DOF. In this invention embodiment we can repeat capture sweeps 2 or more times. Each sweep is done with different reference path length and different focusing distance of the sample such that the entire depth is scanned.

Example

Suppose we want to map the depth of a sample in a range of 2 mm, meaning we must set DOF=2 mm. to maintain focus over range.
Also assume:
 $\lambda$-900 nm—Central Wavelength.
 $f$-20 mm—Focal length.
 u-30 mm—Target distance
 c-15 um—Circle of confusion.
The obtained required aperture (eq 11) is d=0.675 mm
Using (5) the axial resolution would result: dx=33.9 um.
Improving lateral resolution to 10 us, Forces the DOF to be=~0.6 mm. Thus, in single sweep, DOF to resolution tradeoff forces either axial range decrease or low resolution. For this invention we can win both by multi-sweep, each sweep scans different depth ranges by the following:

1. Set the aperture d to the desired dx resolution.
2. Set the opt' path length of the reference arm to match the length of the start of the desired depth range.
3. Set the imaging focusing distance to the same depth as the reference path length is set to.
4. Sweep source and capture images to scan the spectral range.
5. Move reference path length and focusing to the next depth slice, typically by a measure of 1 DOF.
6. Repeat Sweeping again for the next slice.
7. Continue slice sweeping steps 5 and 6 until the entire depth range is covered.
8. Final 3d representation can be obtained from combining the slices maps to each other. May need smart registration step to align the slices to each other.

Thus, by splitting the depth range to sub ranges (slices) we can improve lateral resolution while having larger depth work range than can be obtained in single sweep.

Noting also that increasing the aperture d of the optics not only improve resolution but also increases the collected light power from the sample and reduces speckle noise in the captured sample.

Full Field TD-OCT:

Another embodiment is Time-Domain Full Field OCT (FF-TD-OCT), also using a 2D sensor array for direct imaging of the retina over the sensor surface without the need 1D or 2D scanning method. The light source used in this method is wide band, typically in the NIR range. Referring to FIG. 2. a phase modulator in the reference arm modulates the phase of light between 2 phases about $\lambda/4$ amplitude of the center wavelength, obtaining modulation p-p of $\sim\lambda/2$, alternating between 2 discrete phases, sinusoidal or any other shape that alternates these phases. The phase modulation of the reference arm light returning to the sensor is than positively and negatively interfere with the back propagated sample arm light, but only the portion of sample light that returns from the same optical distance as the reference arm within the coherence window. Modulation amplitude at the sensor indicates the reflectivity of the sample at the coherence window distance. The reference optical path is modified as the motion of mirror changes the optical path, causing the coherence distance in the coherence depth in the sample to change accordingly.

Figure 4:
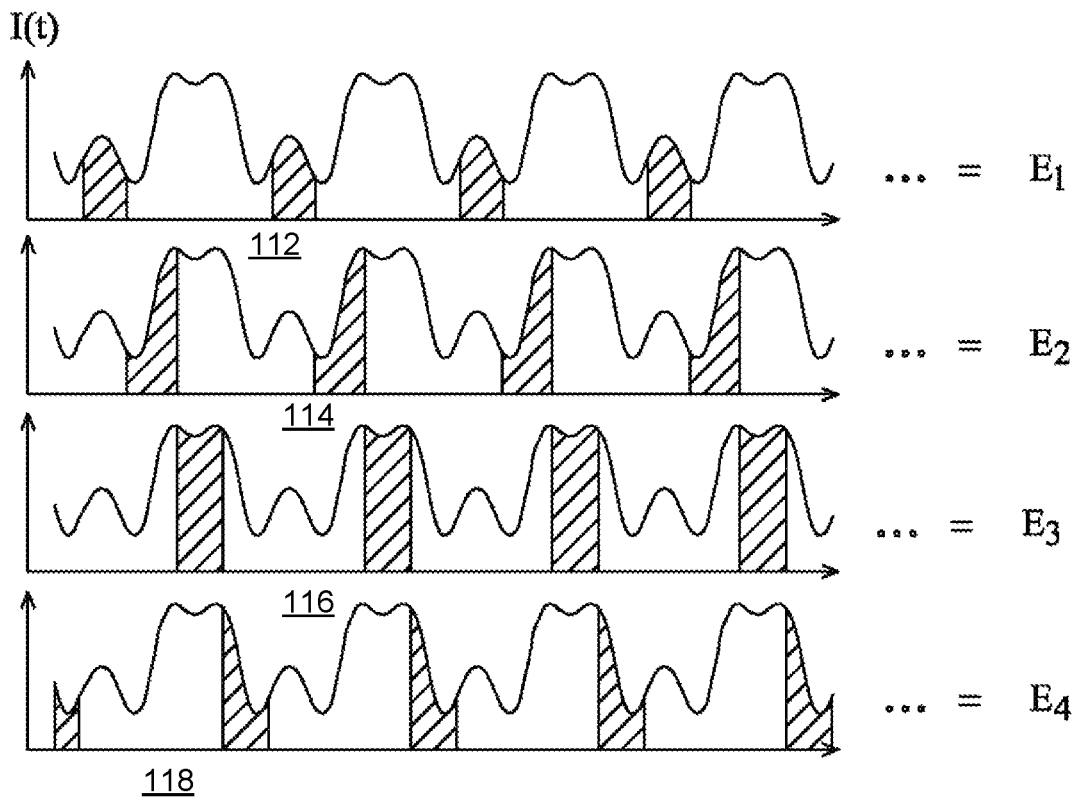
FIG. 4 is an example of a timing diagram and an example of a sensing element and four charge accumulators.
Figure 4:
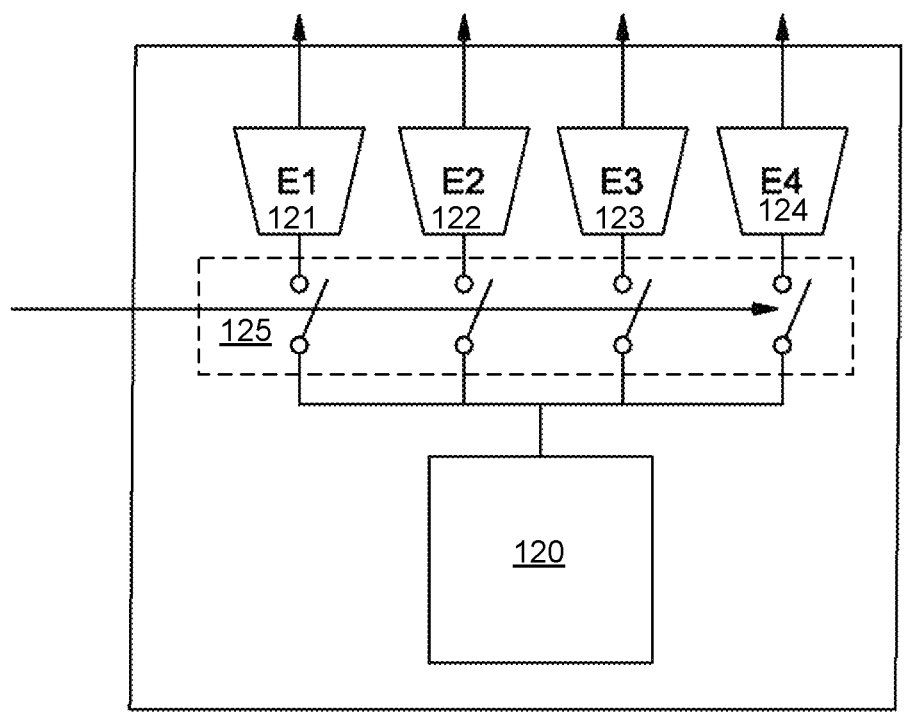

FF-TD-OCT with Multi Node Sensor:

In this invention, one embodiment, we implement FF-TD-OCT by using a multi-node 2D sensor, a multi-node sensor is a sensor that can capture and accumulate optical energy into plurality of accumulation buckets (nodes) during exposure time. The collected photoelectrons at the photodiode (PD) in the pixel active area can be accumulate into a plurality of nodes in accordance to control signals receive in the pixel that direct the collected charges to one of the nodes. FIG. 4 shows 4 node pixel exposure to collect 4 cycle parts of $\pi/2$ each.

FIG. 4 illustrates a Multi Node pixel structure explanation. Image a illustrates a cyclic signal capture, each bucket (node) (of four buckets 121, 122, 123 and 124) collects light energy at different exposure time (see different dashed areas in timing diagrams 112, 114, 116 and 118)—using switching unit 125 to distribute the charges between the bucket, in this case the buckets are set to collect integrated charge in the PD 120 of different time interval such that each one gets ¼ of the modulation cycle. A pixel structure principal of operation shown where the charge collected in the PD passed to one of the buckets E1 ... E4 in accordance to the control lines in the pixel. The sensor activated in homodyne receiving mode such that each node exposed to a phase of the modulating frequency for multiple modulation cycles and aggregates the photo-electrons at the node for many cycles, number of accumulated cycle can be arbitrary selected as there is no theoretical limit.

For Example—using 4 nodes sensor, overall sensor exposure time may be 1 ms and the phase modulation frequency is 100 kHz. So, within exposure time there would be 100 modulation cycles. The buckets (nodes) E1 ... E4 are filled with accumulated charge over this time duration of 1 ms. Each node collects light for 2.5 us, one after the other in a cycle of 10 us. After the exposure time each bucket would contain 100 accumulations of its phase during the overall exposure time. This kind of sensor already existing in as a commercial product. Typically, time-of-flight sensor that is being used for 3D sensing systems for various applications, in this invention we utilize this functionality for demodulation of the returned interferometry from the sample exposure time of the sensor may have many cycles of modulation. One such sensor is Teledyne Hidra 3D, a 3-Node sensor that is having array of 640×480 pixels. Can be operated up to ~400 frames per second.

In case the phase modulation is done at the reference arm, the actual receive cycle time may slightly differ from the modulation frequency due to doppler effect. By: $f_s = f_m + 2v_r/\lambda$. Where $f_s$—is the sampling frequency, $f_m$ is the phase modulation frequency $v_r$ ir the OPL velocity [m/s] and $\lambda$ is the central wavelength. due to the reference arm OPL change velocity due to doppler effect. E.g. for modulation of 100 kHz and OPL velocity is 1 mm/see and wavelength=1 um. The Sampling frequency will be 102 kHz.

This method enables to obtain the full data Required for the modulation amplitudes evaluation within very short duration without being worried about sample motion during capture since the overall exposure time is quite short relative to 4 different exposures and read-out.

The example here of 4 nodes pixel type is one embodiment where we can use various number of pixel nodes starting from 2 to N where N can be any reasonable native number. In a special case of a pixel which is having only two nodes we can still evaluate the amplitudes by utilizing a small phase shift between the modulation and the nodes exposures such that the a phase between the modulated signal and the phase switching would change during the exposure to sweep along all the phases such that the phase would be correct at least part of the exposure time so the amplitude signal obtained might be smaller because of this swift however still projecting a reliable and valuable he amplitude data.

For the case of 4 node pixel the amplitude can be calculated by the following:

$$D_s = -E_1 + E_2 + E_3 - E_4 \quad (8)$$

$$D_c = -E_1 + E_2 - E_3 + E_4 \quad (9)$$

It was shown that:

$$A^2 \alpha\ D_s^2 + D_c^2 \quad (10)$$

where A is the modulation amplitude. It was also shown that proper selection of modulation parameters can help optimize the amplitude estimation accuracy.

This description is a possible implementation of an embodiment where in the general case that as long as the phase modulator alternates the phase sufficiently for modulating the sample in the coherence window with the reference arm interference and the sensor demodulates by a sampling rate that satisfy the Nyquist theorem the conditions enable producing the desired OCT depth mapping.

Figure 5:
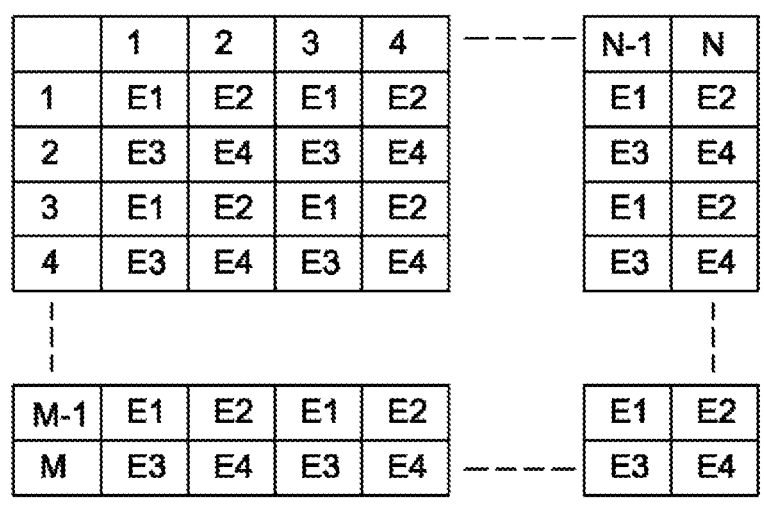
FIG. 5 is an example of two dimensional arrays of sensing elements.

Another option to implement a multi node pixel which implement phase sensitive data accumulation over modulated signal may be done using sensor with pixel array with one node per pixel however there are several pixel types where each pixel type would integrate at different exposure windowthat is the pixels are different in their activation characteristics as they have different exposure timing schedulers within the sensor. Proper setting of the pixel types can obtain different phase per pixel. Enabling operation of amplitude measurement. As an example. A pixel array with 4 types of pixels may be arranged as shown in FIG. 5. The full image resolution for the 4 exposures may be obtained by means of interpolation. Like the de-mosaicking done for RGB sensor. In this method the resolution is obviously reduced relative to the 4-node pixel but might be preferred once cost and availability considerations added. The 4-pixel type case is only an example; one should note that other multi-pixel types of arrangements possible.

FIG. 5 is an example of 4-pixel type sensor arrangement. N×M array 130, E1 to E4, exposure time for each pixel type can be set to accumulate light at different timing. In this case 4 phases. Thus sensing elements E1 are activated to sense radiation at a first phase, sensing elements E2 are activated to sense radiation at a second phase, sensing elements E3 are activated to sense radiation at a third phase, and sensing elements E4 are activated to sense radiation at a fourth phase. There may be two or more phases.

FF-TD-OCT Processing Flow.

Figure 6:
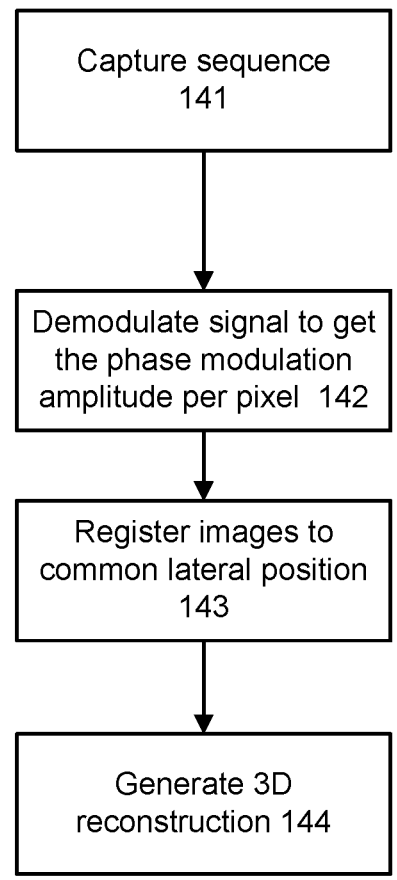
FIG. 6 is an example of a method.

The TD-OCT is less sensitive to axial movements as the modulation is being measured directly from the signal. As discussed for the FF—SS-OCT, capture sequence (denoted 141 in FIG. 6) of images is identical, the difference is the moving optical path between samples instead of light wavelength as the SS method. A series of flashes, each flash is fast enough to eliminate lateral motion. Followed by sensor read-out time and next flashes/exposures taken until sequence end. The process processed to step 142 of demodulating signal to get the modulation amplitude per signal—the demodulating includes calculating the modulation—for example based on E1, E2, E3 and E4. The processing flow contain a registration step 143 to align images one to the other as it would be expected that the sample would move during capture. Step 143 is followed by step 144 of generate a three dimensional (ED) reconstruction. This is illustrated at FIG. 6 that Illustrates an example of Processing flow 400 for generating depth mapping using FF-TD-OCT FF-TD-OCT Enhanced Resolution.

The OCT axial resolution is determined largely by the spectral width of the light source. For TD-OCT increasing axial resolution can be done simply by increasing the bandwidth of the source. Regarding the lateral resolution. Theinherent tradeoff between DOF and resolution as described above apply.

For the TD case, the tradeoff can be resolved as the optical focus distance can be synchronized with the TD reference arm path length such that the point of coherence at the sample would be within focus during scan. That is the fucus would be altered in conjunction with the optical path length to obtain high lateral resolution at the same depth plane for both. See tuneable focusing optics 45 at FIG. 2. As a result, we could leverage the OCT performance considerably. Alternatively, the focus depth can be in stepwise motion along the change of path length. Assuring the coherence window would be within DOF during scan. This way the lateral and axial resolutions are unbounded for any desired scan depth.

The focus sweep may be continuous over time in parallel to the ref arm path length change. For simplicity without big loss of performance the focus sweep may be in discrete steps of some portion of the optical DOF.

OCT Snr Discussion.

There are many factors affecting signal quality here we briefly review major SNR influencers for the purpose of explaining benefits of our invention relative to traditional OCT.

It has been shown that an interference modulation contrast shot noise shot noise limited performance can be obtained. Shot Noise SNR of TD-OCT Given by:

$$SNR_{TD-OCT} = \frac{\rho P_s R_s}{2eB} \quad (20)$$

Where $\rho$ is the responsivity of the detector, $P_s$ is the instantaneous optical power incident on the sample, $R_s$ is reflectance of the sample at the interferometry depth, B is the electrical bandwidth of the detector and e is the electronic charge.

The SD-OCT the SNR is:

$$SNR_{SD-OCT} = \frac{M}{2} \frac{\rho P_s[k_m] R_s}{2eB} \quad (21)$$

With $P_s[k_m]$ being the fraction of instantaneous optical power incident on the sample that corresponds to the $m^{th}$ spectral channel of the detection channel the SS-OCT case is identical to the SD-OCT in this regard, and M is the number of detection channels (SS samples). We note that $SNR_{SD-OCT}$ factorized by M/2. Notice that if we increase the power in the TD-OCT by the factor of M/2 both SNR's would be equivalent. In many cases, ophthalmology for example, the safety restriction would not allow for such a large power increase. In practice, the FT based methods are indeed better with regard to SNR, but in less extend given in the analysis. As the activation assumptions are different.

Using FF-OCT changes the illumination regime over the sample relative to spot or line scanning method. For spot scan—each area in the sampled region is illuminated once during scan, this means that the instantaneous power is very high for a short while. Where the FF method illuminates the entire area at the for many and relatively lower peak pulses. As a result, in the FF-OCT case the power limit is much higher thus enabling compensation overt the SD-OCT method.

Regarding SNR, due to safety regulations, especially eye safety, illumination regime of long, low peak pulse enables projecting with higher overall power. Thus FF-OCT is able to expose to higher power during the scan, this is a big advantage for FF-OCT. FF-SS-OCT is potentially the best method as it has the advantage of FF illumination regime combined with the inherent SD/SS SNR advantage.

The SD-OCT and SS-OCT Fall-Off effect causes for contrast degradation as the depth reconstruction is deeper in the sample, due to that the wavelength slices width reduces the k domain signal. This issue may be resolved as the swipe of wavelength obtained with discrete steps, so each sample gets one wavelength.

Another issue relates SD and SS-OCT is the Autocorrelation noise, describes above, it is due to the fact that the coherence length of each wavelength sample is quite wide, thus all sample internal reflectance interferes between one to another, there are methods to overcome it but with cost of price and complexity. The method FF-TD-OCT described here does not have this issue as the coherence length is low.

One more issue SD and SS-OCT is the speckle noise associated with narrow-band imaging due to the monochromatic nature of the frames this method using. In this invention FF-TD-OCT broadband light sources that features much lower speckle noise.

This Invention FF-OCT Advantages.

The Advantages for this Invention are:
  Simplify optics, eliminate the need for scanning.
  Enable more power projection once safety is a concern. Relative to spot or line scanning methods due to better safety conditions.
  Enable concurrent usage of the same collection optics and sensor for other imaging modalities.
  TD-FF-OCT case, inverse FT operation is not needed. Reduced speckle noise, no autocorrelation noise.
  In-vivo usage possible. Dispersion and mechanical jitters handled easily.

All OCT methods described above, SS and TD are full-field imaging. Employing simple imaging without moving parts and sophisticated scanning optical modules, relatively low rate of illumination and data capture. These FF based OCT having cost/effectiveness/form-factor advantages over traditional OCT implementations today. Proposes, high axial resolution, diffraction limited spatial resolution and un-bounded depth range.

Figure 7:
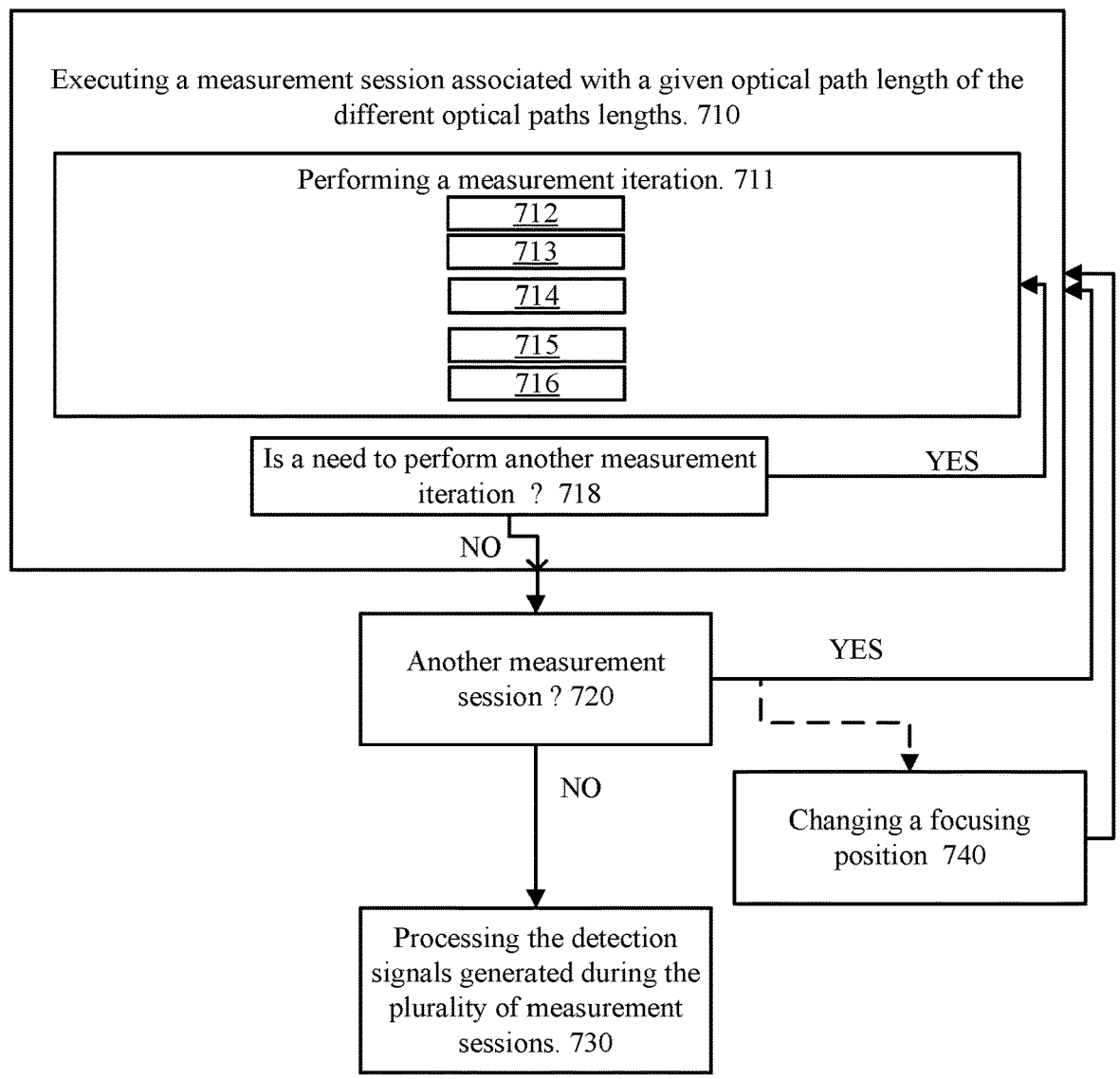
FIG. 7 is an example of a method.

FIG. 7 illustrates an example of method 700 for method for optical coherence tomography (OCT).

Method 700 may include performing a plurality of measurement sessions. Different measurement sessions are associated with different optical paths lengths of a reference arm of an interferometer.

Method 700 may include step 710 of executing a measurement session associated with a given optical path length of the different optical paths lengths.

Step 710 includes performing measurement iterations.

Step 710 may include step 711 of performing a measurement iteration. Step 711 may include steps 712-716.

Step 712 includes illuminating a sample by radiation that passes through a sensing arm of the interferometer.

Step 713 includes phase modulating of the radiation that propagates within an arm of the interferometer, wherein the arm is selected out of the sensing arm and a reference arm, wherein the phase modulation has a modulation cycle.

Step 714 includes merging radiation that exits the reference arm with radiation from the sensing arm that returned from a sub-region of an sample to provide an interference pattern.

Step 715 includes generating signals indicative of the interference pattern by two dimensional (2D) arrays of sensing related elements of a sensing unit, wherein different 2D arrays of sensing related elements sample the interference pattern at different detection periods within the measurement iteration. A duration of each one of the detection periods is a fraction of the modulation cycle. The duration of each one of the detection periods may be determined based on a phase modulation frequency and a rate of change of the reference arm optical paths lengths.

Step 716 includes aggregating, by the sensing unit, signals obtained by each one of the sensing related elements during the measurement iterations to provide measurement session results.

Step 711 may be followed by step 718 of checking if there is a need to perform another measurement iteration—and if so—repeating the execution of step 711.

Step 710 may be followed by step 720 of checking if there is a need to perform another measurement session—while using another optical path length of the different optical patch lengths—and if so—repeating step 710 with another value of the given optical path length.

Method 700 may also include step 730 of processing the detection signals generated during the plurality of measurement sessions.

The sensing related element may be a radiation detector. The radiation sensor may be followed by a charge accumulator.

The sensing related element may be a charge accumulator that is preceded by a radiation detector that is in communication, via a charge distribution circuit, with the charge accumulator and one or more additional charge accumulator.

The duration of a measurement session may not exceed 1 milliseconds—or may not exceed any other time threshold.

The depth of the sub-region corresponds to the given optical path length of the reference arm.

Step 730 may provide three dimensional (3D) information about the sample. The 3D information may describe the 3D structure of the sample.

Step 730 may include registering measurement session results of different sessions. The registering may include lateral position compensation or any other registration.

Step 730 may include contrast optimization.

Step 730 may include processing measurement session results from at least some of the plurality of measurement sessions to provide three dimensional information about the sample.

Step 730 may include aligning measurement session results from the at least some of the plurality of measurement sessions.

Method 700 may include step 740 of changing a focusing position of the sensing arm and preforming another plurality of measurement sessions. Thus-step 740 may be followed by step 710. Step 740 may be preceded by step 720.

A depth of the sub-region corresponds to the given optical path length of the reference arm and to the focusing position of the sensing arm.

Interference patterns obtained during the plurality of measurement sessions may be indicative of a first layer of the sample. Interference patterns obtained during the other plurality of measurement sessions may be indicative of a second layer of the sample; wherein the first layer is associated with a first depth range and the second layer is associated with a second depth range that differs from the first depth range.

Interference patterns obtained during the plurality of measurement sessions may be indicative of a first segment of the sample. Interference patterns obtained during the other plurality of measurement sessions may be indicative of a second segment of the sample. A first segment may be associated with a first height range and the second segment is associated with a second height range that differs from the first height range.

The changing of the focusing position of the sensing arm may occur along an optical path length change of the reference arm.

The OCT may be executed in vivo or in vitro. Or any other sample of interest.

It should be noted that while method 700 illustrates an example of completing a measurement session and then executing another measurement session—that the measurement iterations may be executed in any order-including jumping from one measurement iteration of a certain measurement session to another measurement of another measurement session without completing the certain measurement session.

There may be provided a device for optical coherence tomography (OCT), the device may include (a) an interferometer, (b) a radiation source, (c) a phase modulator, (d) a sensing unit that may include two dimensional (2D) arrays of sensing related elements; and (e) a controller that may be configured to control a performing of a plurality of measurement sessions; wherein different measurement sessions may be associated with different optical paths lengths of a reference arm of an interferometer.

During a measurement session that may be associated with a given optical path length of the different optical paths lengths, the OCT device may be configured to perform measurement iterations, wherein for each measurement iteration: (A) the interferometer may be configured to illuminate an sample by radiation that may be generated by the radiation source and passes through a sensing arm of the interferometer; (B) the phase modulator may be configured to phase modulate the radiation that propagates within an arm of the interferometer, wherein the arm may be selected out of the sensing arm and a reference arm, wherein the phase modulation has a modulation cycle: (C) the interferometer may be also configured to merge radiation that exits the reference arm with radiation from the sensing arm that returned from a sub-region of an sample to provide an interference pattern; and (E) the sensing unit may be configured to: (e1) generate signals indicative of the interference pattern by a D array of sensing related elements, wherein different D arrays of sensing related elements sample the interference pattern at different detection periods within the measurement iteration; wherein a duration of each one of the detection periods may be a fraction of the modulation cycle; and (e2) aggregate signals obtained by each one of the sensing related elements during the measurement iterations to provide measurement session results.

The device may be configured to execute method 700. The device may include a processing circuit that is configured to execute step 730.

An example of a device is illustrated in FIG. 2, and examples of sensing related elements are illustrated in FIGS. 4 and 5.

Figure 8:
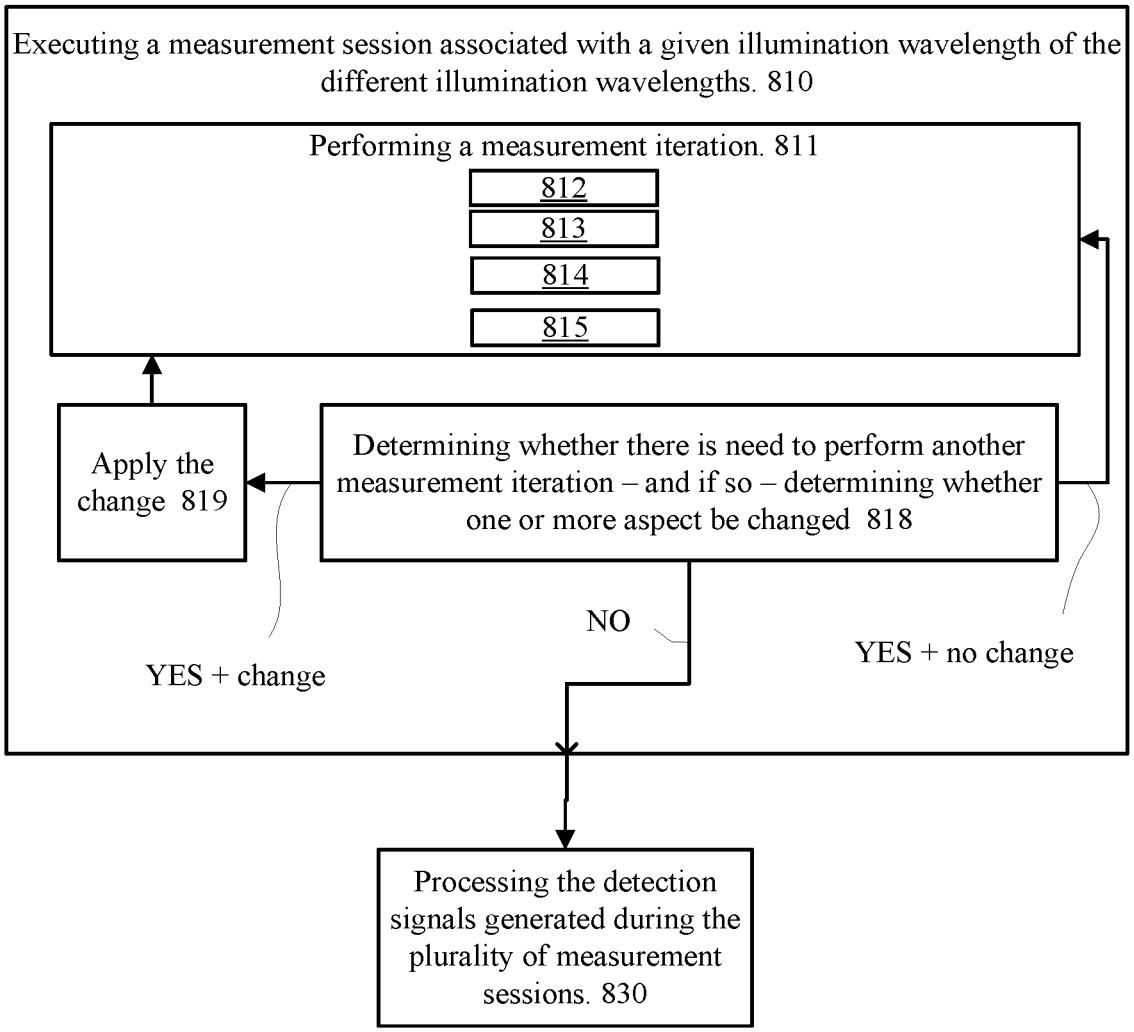
FIG. 8 is an example of a method.

FIG. 8 illustrates an example of method 800 for method for optical coherence tomography (OCT).

Method 800 may include performing a plurality of measurement sessions. Different measurement sessions are associated with different illumination wavelengths generated by a coherent radiation source.

Method 800 may include step 810 of executing a measurement session associated with a given illumination wavelength of the different illumination wavelengths.

Step 810 includes performing multiple sets of measurement iterations. Different sets are associated with different phase shifts introduced to radiation in an arm of the interferometer, the arm is selected out of a reference arm and a sensing arm.

Step 810 may include step 811 of performing a measurement iteration. Step 811 may include steps 812-815.

Step 812 may include illuminating an sample by radiation of the given illumination wavelength, the radiation passes through a sensing arm of the interferometer.

Step 813 may include introducing the phase shift of the set in the arm of the interferometer.

Step 814 may include merging radiation that exits the reference arm with radiation from the sensing arm that returned from a sub-region of an sample to provide an interference pattern.

Step 815 may include generating signals indicative of the interference pattern by a two dimensional (2D) array of sensing related elements out of different 2D arrays of sensing related elements that belong to a sensing unit, the 2D array is associated with the phase shift of the set.

Step 811 may be followed by step 818 of how to proceed.

Step 818 may include determining if there is a need to perform another measurement iteration.

Step 818 may include determining whether to change any aspect related to the next measurement iteration—for example is there a need to change a phase shift and/or whether there is need to change a focusing position of the sensing arm.

Step 818 may be followed by step 811 if there is a need to perform another measurement iteration without changing an aspect.

Step 818 may be followed by step 819 of changing one or more aspect (phase shift and/or focusing position) and jumping to step 811.

Step 818 may follow by ending the method when no more measurement iteration is required.

Method 800 may also include step 830 of processing the detection signals generated during the plurality of measurement sessions.

Step 830 may include processing measurement results of the plurality of measurement sessions to provide three dimensional (3D) information about the sample.

Step 830 may include inverse Fourier transform to generate depth related information of the sample.

Step 830 may include registering measurement session results of different sessions. The registering may include lateral position compensation or any other registration.

Step 830 may include contrast optimization.

Step 830 may include processing measurement session results from at least some of the plurality of measurement sessions to provide three dimensional information about the sample.

Step 830 may include aligning measurement session results from the at least some of the plurality of measurement sessions.

It should be noted that while method 800 illustrates an example of completing a measurement session and then executing another measurement session—that the measurement iterations may be executed in any order—including jumping from one measurement iteration of a certain measurement session to another measurement of another measurement session without completing the certain measurement session.

There may be provided a device for optical coherence tomography (OCT), the device may include (a) an interferometer, (b) a coherent radiation source, (c) a phase shifter, (d) a processing circuit, (e) a sensing unit that comprises two dimensional (2D) arrays of sensing related elements; wherein different 2D arrays are associated with different phase shifts; and (f) a controller that is configured to control a performing a plurality of measurement sessions. Different measurement sessions are associated with different illumination wavelengths generated by the coherent radiation source.

During a measurement session that is associated with a given illumination wavelength of the different illumination wavelength the device is configured to perform different sets of measurement iterations, wherein the different sets differ from each other by a phase shift introduced to radiation in an arm of the interferometer and by the phase shifter, the arm is selected out of a reference arm and a sensing arm.

During a measurement iteration of a set of measurement iteration that is associated with a given phase shift: (A) the interferometer is configured to illuminate an sample by radiation of the given illumination wavelength, the radiation passes through a sensing arm of the interferometer; (B) the phase shifter is configured to introduce the given phase shift of the set in the arm of the interferometer; (C) the interferometer is configured to merge radiation that exits the reference arm with radiation from the sensing arm that returned from a sub-region of an sample to provide an interference pattern; (D) a 2D sensing array that is associated with the given phase shift is configured to generate signals indicative of the interference pattern.

The processing circuit may be configured to process measurement results of the plurality of measurement sessions to provide three dimensional (3D) information about the sample. An example of a device is illustrated in FIG. 2, and examples of sensing related elements are illustrated in FIGS. 4 and 5.

Multiple Operational Modes
Combining FF-OCT+Imaging

The FF-OCT, regardless of if its TD, SS as described in this invention, utilizes 2D imaging optics from the sample to 2D sensor area. The sensor may be low-cost CMOS, (multi-node at TD case). Given this design one can combine various other modes of imaging using the same detector array and optics. A great advantage for cost reduction and form factor.

Figure 9:
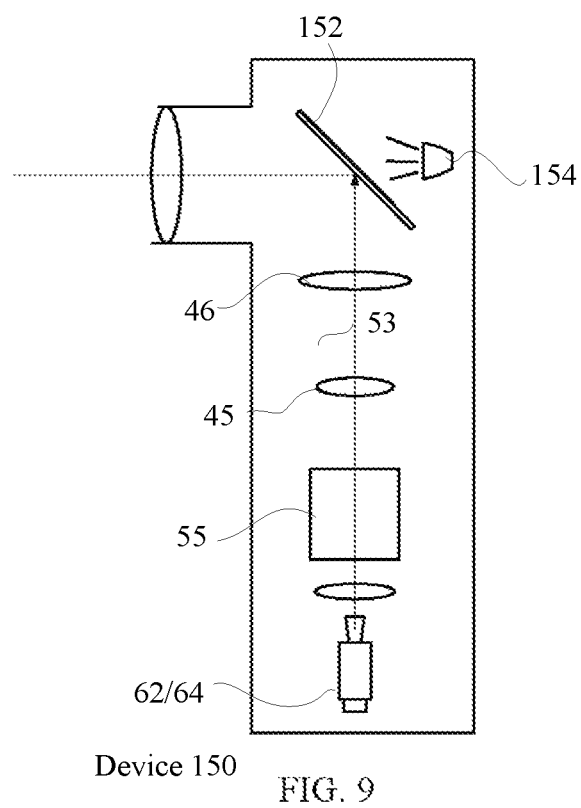
FIG. 9 is an example of a device for OCT and another modality.

Referring to FIG. 9. The device 150 differs from device 30 of FIG. 2 by replacing folding mirror 53 by a second beam splitter 152 and adding a second light source 154. The device 150 may include additional elements—as shown in the front view of FIG. 2.

For all the non-OCT modes the, interferometer reference arm may disrupt the imaging path, hence should be blocked from reaching the sensor. An optical dumper may be inserted in the reference path. Or replacing the first beam splitter with a mirror.

RGB Imaging+OCT

The OCT typically uses the IR wavelength it can be at the range of 800-1300 nm, we can also project visible broadband illuminating (400-700 nm) at light source 154 and review the obtained RGB image a consumer-based CMOS sensor with Color Filter Array (CFA). Typically named RGB sensor or equivalently use alternating light Red, Green and Blue to get RGB images of the sample.

If the device is used for fluorescence, then a filter may be added to prevent excitation wavelength radiation from reaching the sensor in the imaging path. The beam splitter may be a dichroic beam splitter that passes the excitation wavelength and reflects the fluorescence wavelength. The second light source may be various options such as white light, broadband VIS+NIR or optionally narrow band of any desired wavelength. The light returning from the sample will partially be reflected from the beam-splitter to the 2D sensor direction, as it's the same imaging optics, the sensor will generate an image of the sample. The sensor may be spectrally sensitive such as RGB sensor providing colored image and the spectral content of the sample may be analyzed.

Spectroscopy

Another modality of use is spectroscopy. Using A light source 154 that is the exit of combined plurality of wavelengths. A set of LED's each at different wavelength are all directed into optical fiber, each wavelength can be activated separately one after the other, images of the sample can be captured per wavelength. From the plurality of images an accurate spectroscopy analysis can be done. This light source can also be obtained with broadband illumination source and a plurality of bandpass filters each tuned to different wavelength. Both these methods can provide spectral data for analysis. Registration between images of different wavelength can further be used to better align features as the fixation jitters may reduce image quality during scan. The capture processing flow given at FIG. 6 may be applied here.

Polarization.

Controlling the illumination polarization and/or collection path polarization can enable distinguishing polarization specific objects in the sample.

Fluorescence

Fluorescence imaging can be obtained in the device, referring to FIG. 9, adding a second light source 154 via a second beam splitter, 152 that may be a dichroic beam splitter, where this light source emits light at certain excitation wavelength. And by insertion of an optical spectral filter in the receive path of the optical path between the beam-splitter and the 2D sensor this filter designed to block the excitation wavelength and to pass the fluorescence wavelength, it can be bandpass filter, high pass or low pass. Applying illumination with one wavelength and collection with other wavelength range, the use of optical filter blocks the illumination light and collected only the desired wavelength range, obtaining fluorescence image at the 2D sensor.

When a device is used for OCT and fluorescence—thus the device includes an interferometer-then when operating in a fluorescence mode the reference arm of the interferometer is not used. The 2D sensor may also have a Color Filter Array (CFA), to provide spectral information about the fluorescence wavelength and subtract residual noise from the illumination wavelength. Example: suppose the light source wavelength λi=450 nm and the fluorescence emission may be 500-800 nm. Illumination pulse duration can be 1-2 ns and using 1:1000 cut off spectral filter, there may be a residual back reflected power that can compete with fluorescence power. Using the sensor CFA can help us distinguish between the source signal and fluorescence.

Fluorescence Lifetime FLIO and FLIM

Fluorescence Lifetime Imaging Microscopy (FLIM) and Fluorescence Lifetime Imaging Ophthalmoscopy (FLIO) are imaging method where the florescence of the sample decay time is measured. In this context we regard FLIM as the general case where FLIO and other florescence lifetime measurements are specific cases. Biological materials exhibit fluorescence activity not only characterized by the wavelength and energy of emission, but the fluorescence emission decay time is indicative as well.

The fluorescence lifetime is the average amount of time a fluorophore remains in the excited state following excitation. In recent years there has been huge advancement in this field where dual lifetime composition became relevant for the detection of biological activity, one such method called Förster Resonance Energy Transfer (FRET). The method measures biological activities between donor and acceptor molecules and can give indication of the presence of acceptor molecules near the donor. The donor molecule is typically a fluorescence type with a known typical decay lifetime. But with the presence of acceptor molecule some of the pumped electrons in the higher energy level pass the acceptor at a different rate instead to produce fluorescent illumination. As a result, the fluorescent decay time exhibits 2 or more decay coefficients. In the general case of dual lifetimes, the fluorescent signal can be described as:

$$Fl(t) = I_0 e^{-t/\tau_I} + J_0 e^{-t/\tau_J}$$

That is a superposition of 2 exponential decay times with $I_0$ and $J_0$ is their initial strength and $\tau_I$ and $\tau_J$ their decay lifetime. In many cases the lifetimes $\tau_I$ and $\tau_J$ are known where the strength is the interesting feature. Assuming $I_0$ and $\tau_I$ are the donor inherent property with the absence of the acceptor molecule, the measurement of $J_0$ and $\tau_J$ will sign for the acceptor molecular concentration and/or biological activity. This description is only basic explanation of the importance of the dual lifetime measurement.

There are two basic methods for FLIM measurement, frequency domain and time domain. The time domain typically referred to as Time-Correlated Single Photon Counting (TCSPC) is commonly being used for FLIM as it provides good measurement, but in some cases the frequency domain is being used. Florescence light energy is typically much less than the illumination power by 1-3 orders of magnitude, thus one needs a sensitive collection optics and sensor for accurate and reliable reading. Some FLIM methods use single-photon avalanche diode (SPAD) sensor array combined with photon arrival timing circuits, having high sensitivity but typically at low spatial resolution relative to consumer-based CMOS sensor. A TCSPC method was proposed to provide a FLIM estimate that is based on heterodyne slice-based detection of the signal using fast gated camera.

According to an embodiment, a Time of Flight (TOF) sensor can be utilized for the FLIM measurement, especially the usage of multi-node pixel sensor described above. The advantage of TOF sensor is its price as it's being used for consumer market in many applications. Also, its output data rate is equivalent to regular consumer-based sensors. A typically TOF sensor modulation rate ranges 80-300 MHz, that is the exposure timing of the sensor can be switched on/off at durations smaller than few ns.

Figure 11:
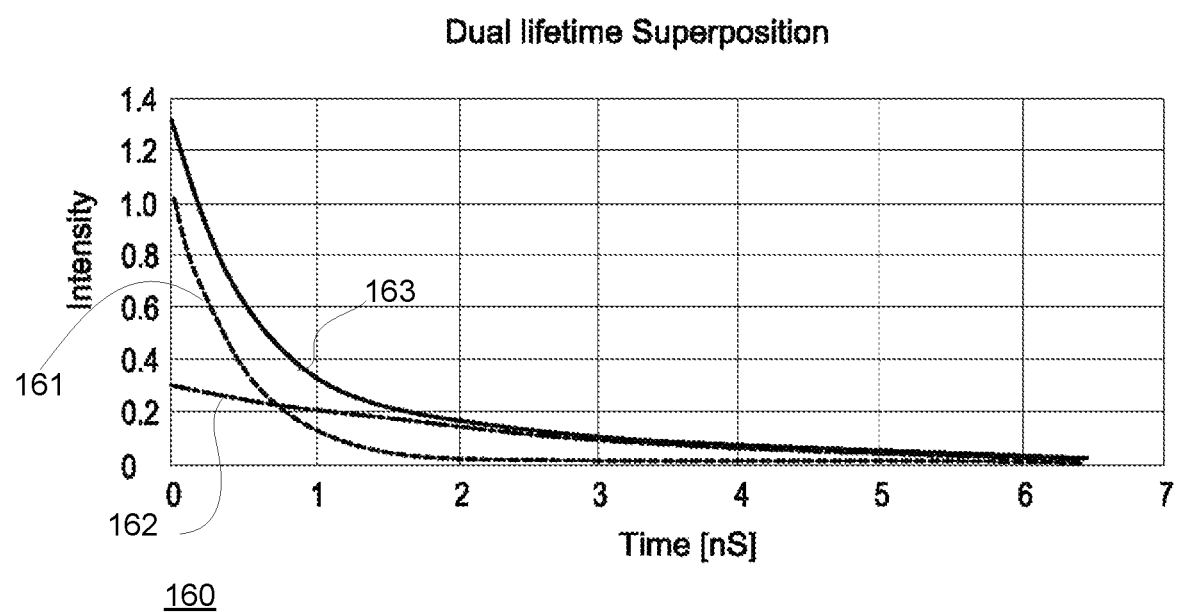
FIG. 11 is an example of decaying signals.

FIG. 11 includes timing diagram 160 that illustrates short and long lifetimes (curves 161 and 162 respectively) for infinitesimal short excitation light pulse. The overall fluorescent emission (curve 163) is a superposition of the 2 separate responses.

Figure 12A:
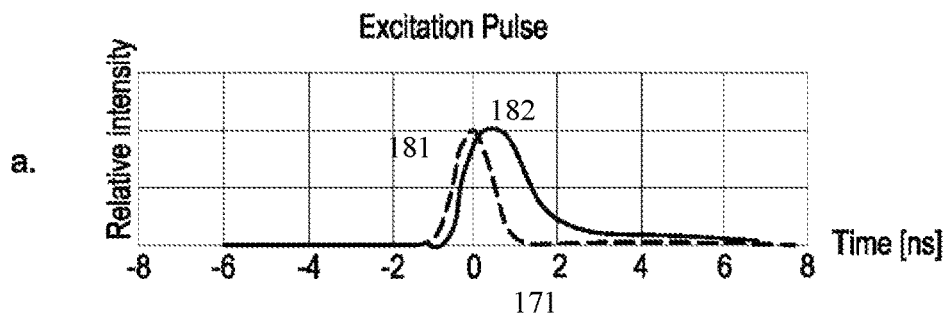
FIGS. 12A-12D are example related to fluorescence signals.
Figure 12B:
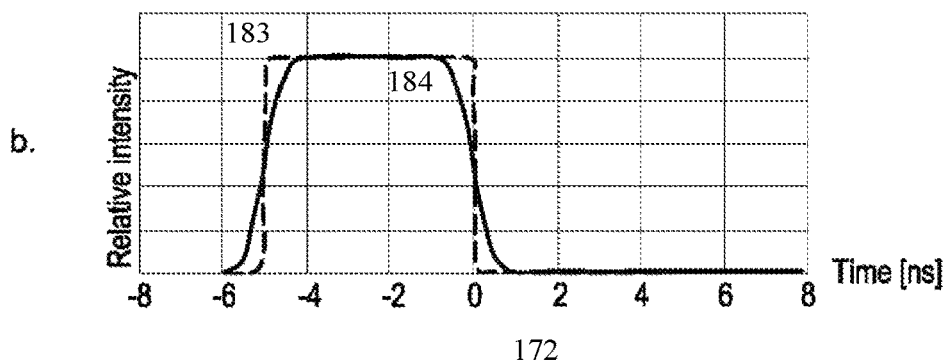
Figure 12C:
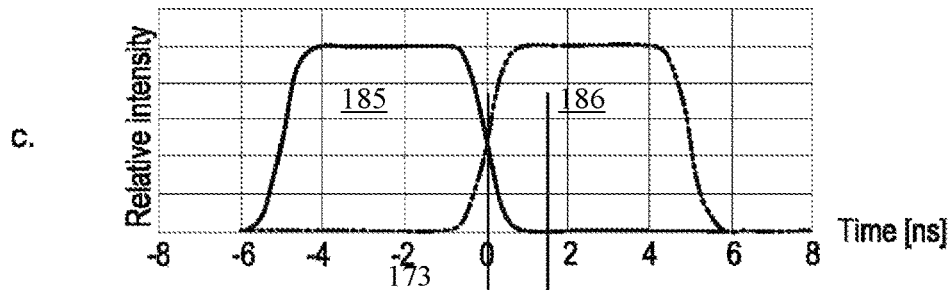
Figure 12D:
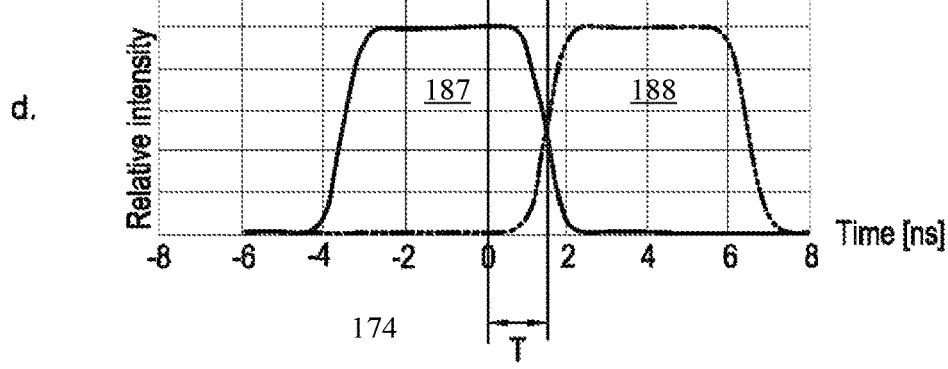

FIGS. 12A-12D illustrate example of timing diagram of the fluorescence light (FL) emission. Timing diagram 171 of FIG. 12A illustrates the excitation emission pulse 181 and the fluorescence response 182. Timing diagram 172 of FIG. 12B illustrates the sensor exposure timing) ideal 183 and actual 184), synchronized to start prior to FL pulse and ending at t=0. Exposure of the pixel photodiode is an analog process with typical rise-time and fall-time that the rise or fall time duration can be at the order of the FL signal. Timing diagram 173 of FIG. 12C illustrates a 2-node pixel sensor where the 2 exposures 187 and 187 are sequence one after the other, and wherein a 2-node pixel sensor where the 2 exposures 185 and 186 are sequence one after the other. Timing diagram 174 of FIG. 12D illustrates a 2-node pixel sensor with delayed phase time=T.

Denote $F_I(t)$ as the fluorescence intrinsic response to ideal excitation pulse emission of the inspected material. And A(t) is the actual excitation temporal profile. Than:

$$S(t) = F_I(t) \otimes A(t)$$

Where S(t) is Fl temporal emission, and $\otimes$ denote the convolution operation. The sensor exposure time can be configured such that its exposure time ends at time t=0 ns. The exposure starts long before the excitation pulse starts and ends at t=0 ns as noted, the exposure time $\Delta T$ can be set to long duration. If the sensor exposure is an ideal top-hat than the collected charge in the sensor pixel would represent the integration cross section with the S(t) signal. But since the exposure is also an analogue signal the pixel readout would be:

$$P(T=0) = \int_{-\Delta T}^{0} S(t) \cdot \alpha(t)\, dt$$

Where $\alpha(t)$ is the analog representation of the exposure responsivity in time. The phase of exposure timing can be configured to any desired timing to obtain phase T dependent charge integration:

$$P(T) = \int_{t1}^{t2} S(t) \cdot \alpha(t-T)\, dt = \int_{-\infty}^{\infty} S(t) \cdot \alpha(t-T)\, dt = S(t) \otimes \alpha(t-T);$$

Denote $t_1$ as the excitation pulse start and $t_2$ as the time S(t) decays to noise level. The exposure time configured to $\Delta T > (t_2 - t_1)$. The P(T) effect is integrative over S(t) from excitation pulse start till the exposure end or S(t) reduces to noise level. Obtaining value of P(T) for T=$t_1$ to $t_2$ done by incrementing the phase T that can be configured for a sequence of N exposure steps $\{T_i\}$; i=1 ... N, Where the $T_i$ Increments can be $(t_2-t_1)/(N-1)$. Note that the $\{T_i\}$ can be spaced in non-linear way for optimization purposes. For $\{T_i\}$ spacing that satisfy Nyquist sampling theorem the pixel reading values set $\{P(T_i)\}$ can be interpolated to continuous time base, resampled & manipulated for the purpose. Remembering that what we look for is the fluorescence decay time of Fr (t) the pixel signal over the sequence of phase sweep given by:

$$P(T) = F_I(t) \otimes A(t) \otimes \alpha(t-T);$$

And define: $I(T) = A(t) \otimes \alpha(t-T)$

Where I(T) is the instrument response for the given excitation pulse and phase delay T. Finaly we can calculate the desires fluorescentce signal $F_I(t)$ by $F_I(t)$=deconvolution (I(T), P(t)).

The usage of a TOF sensor allow for accumulations of many pulses for each phase capture $T_i$ this is very significant for having adequate SNR for the detection signal. As the series of exposure may be in the order of 1e3 to 1e5, depending on the system sensitivity and required throughput. Increasing accumulation count increase the photon collection and helping overcoming dark noise, shot noise and other random noise sources.

A numerical example for such a sequence: the typical lifetime of the decay can be 0.5 to 5 ns. Also assume the excitation pulse duration [−1 ns: 1 ns], so the overall S(t) will span at the range $[t_2, t_1] => [-1$ ns: 6 ns] We can set the phase Ti steps between −1 nm to 6 nm with steps of 0.1 ns using a programmable and accurate delay line. Next we can set the sensor exposure time $\Delta T$=10 ns that satisfies ($\Delta T > (t_2-t_1)$). Each capture sequence can accumulate over N=5000, pulse/accumulation sequences. After each capture the pixel charge will accumulate over 5000 steps allowing for collecting high count of photons, thus no SPAD needed. The pulse rate duration should be long enough to avoid F1 tail accumulation, for pulse rate of 50 ns and 5000 pulses the overall sequence duration is 250 us=0.25 ms. Following the sequence a read out of pixel charge process done to get P(Ti) for i=1, The process of accumulation and read out repeats for i=2 to i=71 (−1 ns to 6 ns with 0.1 ns steps). Modern sensors read-out duration may be ~2-5 ms. Thus the overall capture sequence of the 71 frames is 71*(0.25 ms+5 ms)=372.75 ms that is the whole capture sequence duration is <1 sec.

Further improvement can be gained with the use of 2 node sensor using a second exposure time for the second node, noted as β(t). Starting right after α(t) for the same exposure duration, β(t) starts the exposure at T for duration of $\Delta T$. Similarly the end of its exposure should be later that $t_2$ for all phases. See illustration at FIG. 12D. Define $$\alpha_n(t) = \frac{\alpha(t)}{\alpha(t) + \beta(t)}$$

The new exposure time $\alpha_n$ (t) is similar to its origin a in the relevant region. However since the denominator [α(t)+β(t)] collects the entire pulse energy it normalize the signal for RIN noise sources such as pulse to pulse variations and drifts. Actually, the complementary assumption of the sum [α(t)+β(t)] may not be guaranteed, it depends on sensor internal realization of node switching. Some such sensors may exhibit such behavior or sufficiently complementary as the photo-electrons in the photodiode well are collected to one of the nodes.

Figure 14:
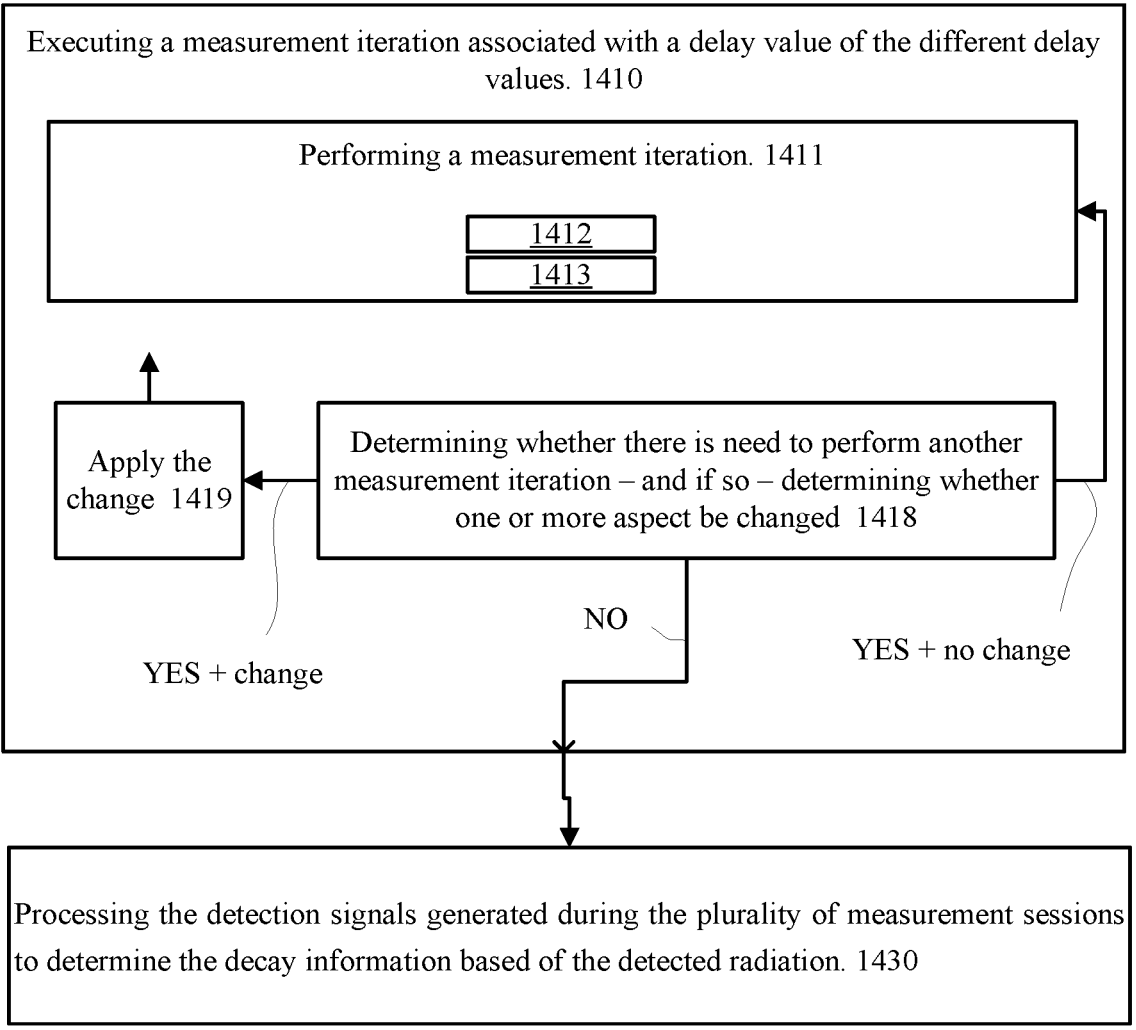
FIG. 14 is an example of a method.

FIG. 14 illustrates an example of method 1400 for determining fluorescence decay information.

Method 1400 may include performing a plurality of measurement sessions; wherein different measurement sessions are associated with different delay values.

Method 1400 may start by step 1410 of executing a measurement iteration associated with a delay value of the different delay values.

A delay value may be positive or negative.

Step 1410 may include steps 1411, 1412 and 1413.

Step 1411 may include illuminating a region of a sample with radiation pulses that result is a generation of fluorescence pulses. The radiation pulse forms a two dimensional spot (2D) on the region.

Step 1412 may include detecting radiation, by a 2D detector of a sensing unit, during detection windows that start at the given delay value from starts of the radiation pulses. Each detection window has a duration that (i) exceeds a duration of the fluorescence pulse, and (ii) does not exceed a time difference between adjacent radiation pulses.

Step 1413 may include aggregating, by the sensing unit, detection signals obtained during the detection windows that start at the given delay value from starts of the radiation pulses.

Step 1411 may be followed by step 1418 of how to proceed.

Step 1418 may include determining if there is a need to perform another measurement iteration.

Step 1418 may include determining whether to change any aspect related to the next measurement iteration—for example is there a need to change a phase shift and/or whether there is need to change a focusing position of the sensing arm.

Step 1418 may be followed by step 1411 if there is a need to perform another measurement iteration without changing an aspect.

Step 1418 may be followed by step 1419 of changing one or more aspect (phase shift and/or focusing position) and jumping to step 1411.

Step 1418 may follow by ending the method when no more measurement iteration is required.

Step 1410 may be followed by step 1430 of processing the detection signals generated during the plurality of measurement sessions to determine the decay information based of the detected radiation.

As indicated above-one measurement iteration may be executed after the other-even regardless of the measurement session associated with the measurement iteration.

The plurality of measurement sessions may include pairs of measurement sessions, at least one pair of measurement sessions comprises a measurement session of a positive delay value and a measurement session of a negative delay value.

The at least one pair of measurement sessions may include a measurement session of a positive delay value and a measurement session of a negative delay value.

The at least one pair of measurement sessions may include a fluorescence pulse rise measurement session and a fluorescence pulse fall measurement session.

The fluorescence pulse rise measurement session may include fluorescence pulse rise detection windows, wherein the fluorescence pulse fall measurement session may include fluorescence pulse fall detection windows, wherein the fluorescence pulse rise detection windows and the fluorescence pulse fall detection windows are interleaved.

For the at least one pair of measurement sessions, step 1413 may include aggregating, by a first aggregation element, detection signals obtained detection windows of a first measurement session of the pair, and aggregating, by a second aggregation element, detection signals obtained detection windows of a second measurement session of the pair.

Step 1430 may include applying a deconvolution operation.

The decay information may be indicative of two decay time constants.

There may be provided a device for determining fluorescence decay information, the device may include, a radiation source, a processing circuit, a sensing unit that may include two dimensional (2D) arrays of sensing related elements; and a controller that may be configured to control a performing a plurality of measurement sessions. Different measurement sessions are associated with different delay values.

During a measurement session that may be associated with a given delay value: (a) the interferometer may be configured to illuminate a region of a sample with radiation pulses from the radiation source that result may be a generation of fluorescence pulses; wherein a radiation pulse forms a two dimensional spot (2D) on the region; (b) a 2D detector of the sensing unit may be configured to detect radiation during detection windows that start at the given delay value from starts of the radiation pulses; wherein each detection window has a duration that (i) exceeds a duration of the fluorescence pulse, and (ii) does not exceed a time difference between adjacent radiation pulses; (c) the sensing unit may be configured to aggregate detection signals obtained during the detection windows that start at the given delay value from starts of the radiation pulses; and (d) the processing circuit may be configured to determine the decay information based of the detected radiation.

At least one of the delay values may be positive and at least one of the delay values may be negative.

The plurality of measurement sessions may include pairs of measurement sessions, at least one pair of measurement sessions may include a measurement session of a positive delay value and a measurement session of a negative delay value.

The plurality of measurement sessions may include pairs of measurement sessions.

The at least one pair of measurement sessions may include a measurement session of a positive delay value and a measurement session of a negative delay value.

The at least one pair of measurement sessions may include a fluorescence pulse rise measurement session and a fluorescence pulse fall measurement session.

The fluorescence pulse rise measurement session may include fluorescence pulse rise detection windows, wherein the fluorescence pulse fall measurement session may include fluorescence pulse fall detection windows, wherein the fluorescence pulse rise detection windows and the fluorescence pulse fall detection windows are interleaved.

For the at least one pair of measurement sessions a first aggregation element of the sensing unit may be configured to aggregate detection signals obtained detection windows of a first measurement session of the pair, and wherein a second aggregation element of the sensing unit may be configured to aggregate detection signals obtained detection windows of a second measurement session of the pair.

The processing circuit may be configured to determine the decay information by applying a deconvolution operation.

The decay information may be indicative of two decay time constants.

Figure 12E:
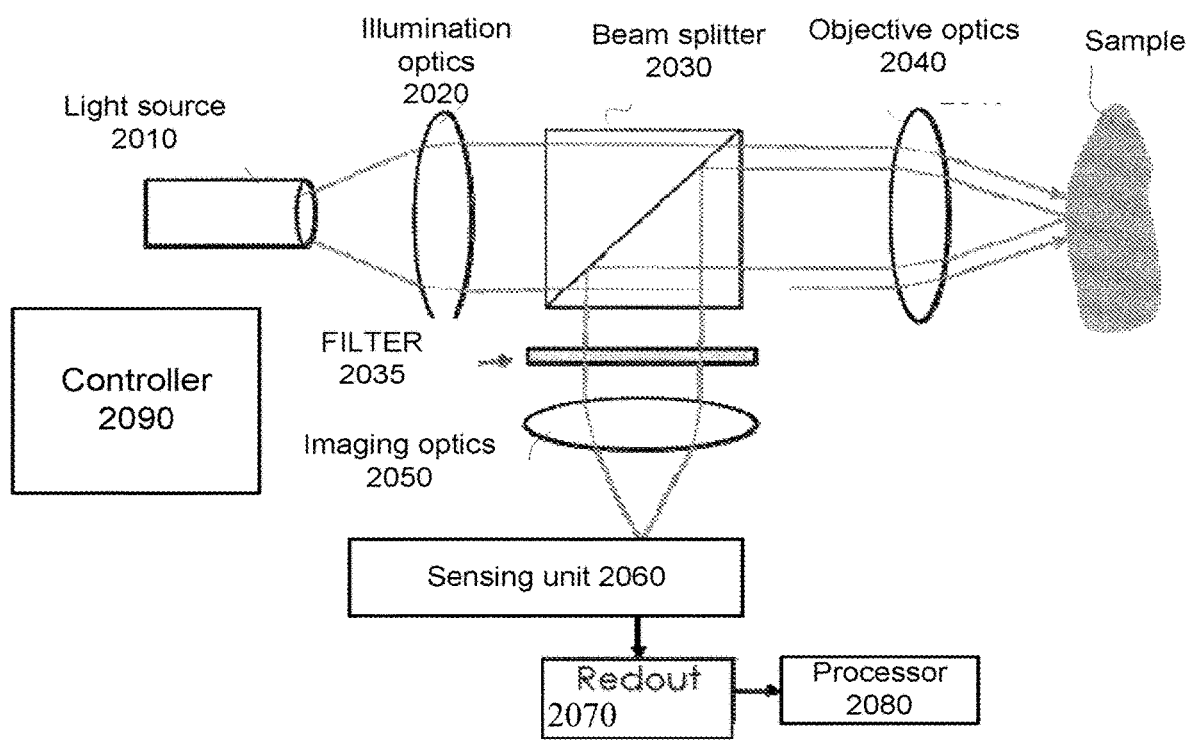
FIG. 12E illustrates an example of a device for determining fluorescence decay information.

FIG. 12E illustrates an example of a device 2000 for determining fluorescence decay information. The device may include a radiation source 2010 such as a light source that is followed by illumination optics 2020, beam splitter 2030 and objective optics 2040 to provide an illumination path that illuminates a 2D area of the sample.

The sample may emit (i) fluorescence radiation and (ii) additional radiation at the frequency of the illuminating radiation.

The fluorescence radiation propagates through the objective optics 2040 to the beam splitter 2030 and is directed through imaging optics 2050 to the sensing unit 2060. Signals generated by the sensing unit 2060 are read by readout circuit 2070 to provide detection signals that are accessible to the processor 2080. The device is controlled by controller 2090.

The additional radiation (at the frequency of the illuminating radiation) propagates through the objective optics and is either blocked by the beam splitter (which may be a dichroic beam splitter) may be directed by the beam splitter to a filter 2035 that blocks the additional radiation. Blocked means that the additional radiation does not reach the sensing unit.

The device may be without a interferometer.

Device 2000 may be configured to execute method 1400.

Figure 10:
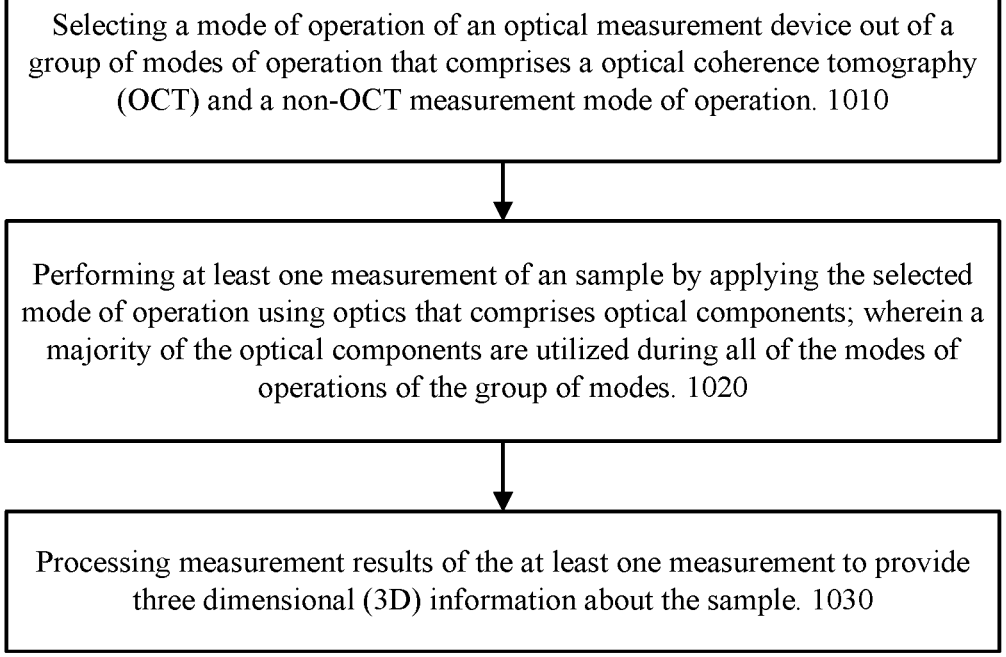
FIG. 10 is an example of a method.

FIG. 10 illustrates an example of method 1000 for multimode measurements.

Method 1000 may start by step 1010 of selecting a mode of operation of an optical measurement device out of a group of modes of operation that comprises an optical coherence tomography (OCT) and a non-OCT measurement mode of operation.

Step 1010 may be followed by step 1020 of performing at least one measurement of a sample by applying the selected mode of operation using optics that comprises optical components; wherein a sensing unit and at least a majority of optical components of an imaging path are utilized during all of the modes of operations of the group of modes.

Step 1020 may be followed by step 1030 of processing measurement results of the at least one measurement to provide information about the sample.

The information may include three dimensional (3D) information about the sample, delay information, and any information from any model.

Method 1000 may include fusing all these modalities data for diagnostics/feature detection and/or may determining information about the sample using information obtained from measurement obtained by different modes of operation and/or different modalities.

The information about the sample may include at least some of the following:

1. 3D OCT mapping
2. Fluorescence image.
3. Fluorescence Decay information.
4. RGB images.
5. A set of spectroscopic images.

The non-OCT measurement mode of operation may be selected from a Fluorescence Lifetime Imaging Microscopy measurement mode, spectroscopy, Fluorescence mode of operation, and the like.

Examples of OCT measurements that may be applied in method 1000 are illustrated in FIGS. 7 and 8.

There may be provided a device for multimode measurements, the device may include optics that comprises optical components; and a controller that is configured to: select a mode of operation of an optical measurement device out of a group of modes of operation that comprises optical coherence tomography (OCT), and a non-OCT measurement mode of operation; and control a performing of at least one measurement of a sample by applying the selected mode of operation using the optics; wherein a sensing unit and at least a majority of optical components of an imaging path are utilized during all of the modes of operations of the group of modes.

The device may include a processing circuit that is configured to process measurement results of the at least one measurement to provide three dimensional (3D) information about the sample.

The device may execute method 1000. Steps of method 1000 may include executing any method of methods 700 and 800.

Figure 16:
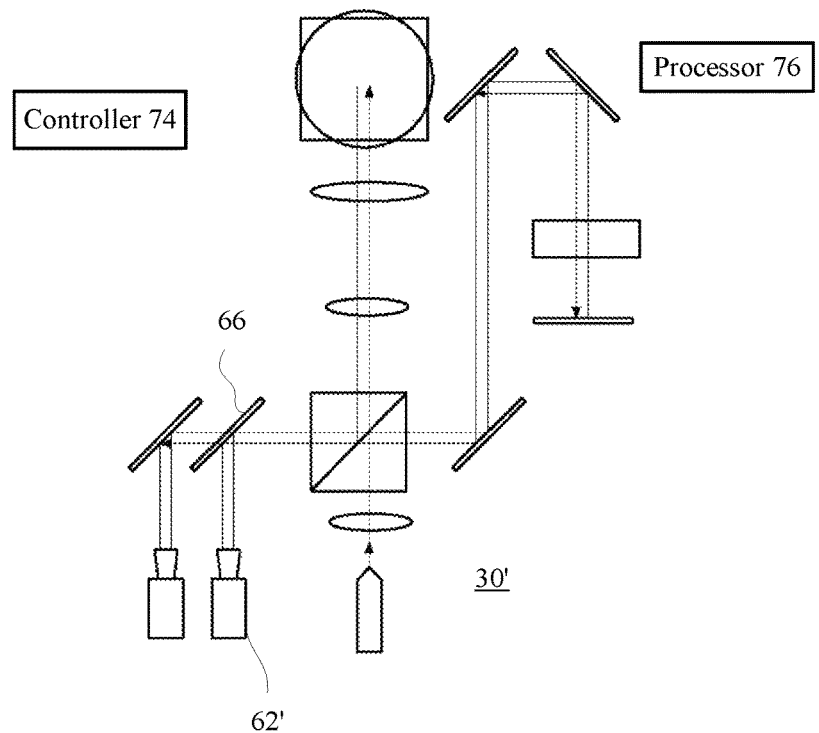
FIG. 16 is an example of a device.

Examples of a device is illustrated in FIGS. 9 and 16. The device may include the elements of the device of FIG. 2 and additional elements. Examples of sensing related elements are illustrated in FIGS. 4 and 5.

Device Mounted on Slit-Lamp

Slit-Lamp (SL) station is a common tool for ophthalmologists to examine the patient eye. Typically, it contains a white light source and a slit mirror to reflect the light source to illuminate the eye posterior or anterior. With imaging optics, The Slit-Lamp device is very common tool that is present at ophthalmology clinics and optometrists.

Figure 13A:
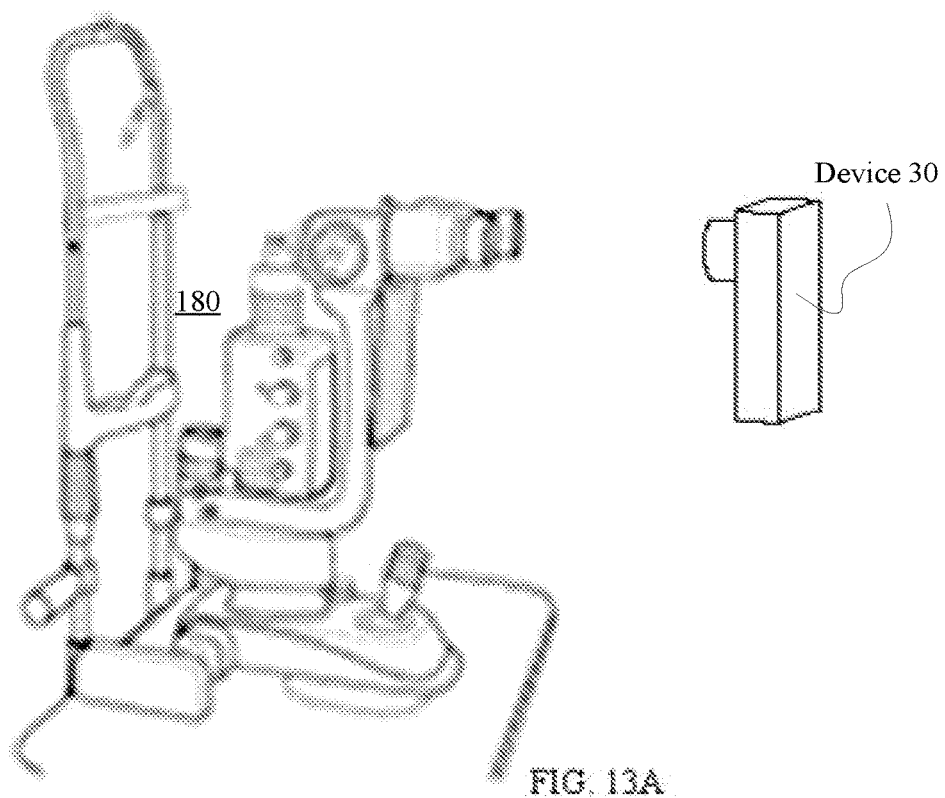
FIGS. 13A-13B are examples of a device for OCT and its environment.

This SL station have a fixed chin rest fixture where the patient places the head and a 3D motion stage to align the optics to the patient's eye. In this invention we employ this capability by mounting the device to the SL while using its chin-rest fixture and 3D motion stage to align it to the eye. This way the ophthalmologist can combine the device of this invention multi-modal inspection and other types of tests one after the other, saving time and space, where tests like OCT, fundus imaging, fluorescence, internal eye pressure and others can be done. FIG. 13A illustrates the invention device 30 and the SL station 180 while FIG. 13B illustrates the OCT devices that is attached to the SL station.

Auto Align Method

Figure 13B:
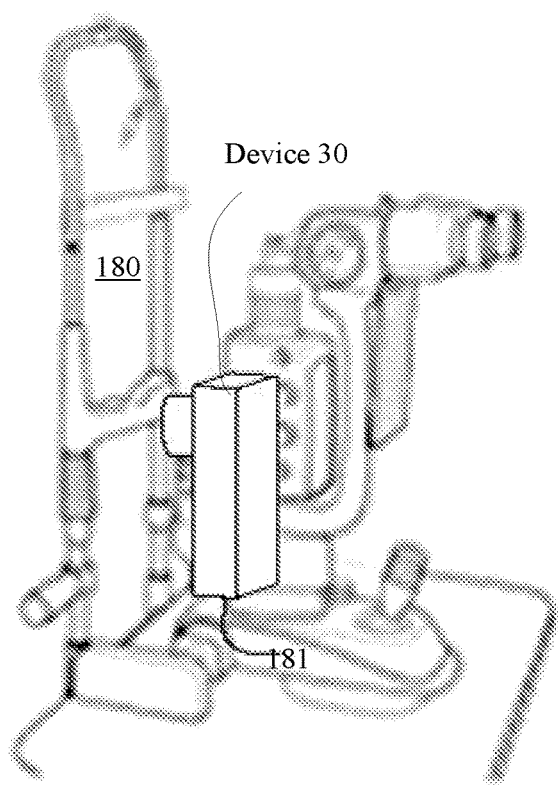

FIGS. 13A and 13B illustrates the device before being mounted and after being mounted on exemplar SL station. A control line 181 illustrates a connection between the device and the SL for auto align method where the device captures images with its main imaging path and dedicated small cameras to review the eye position and provide directions to the 3D motion stage for alignment.

Figure 15:
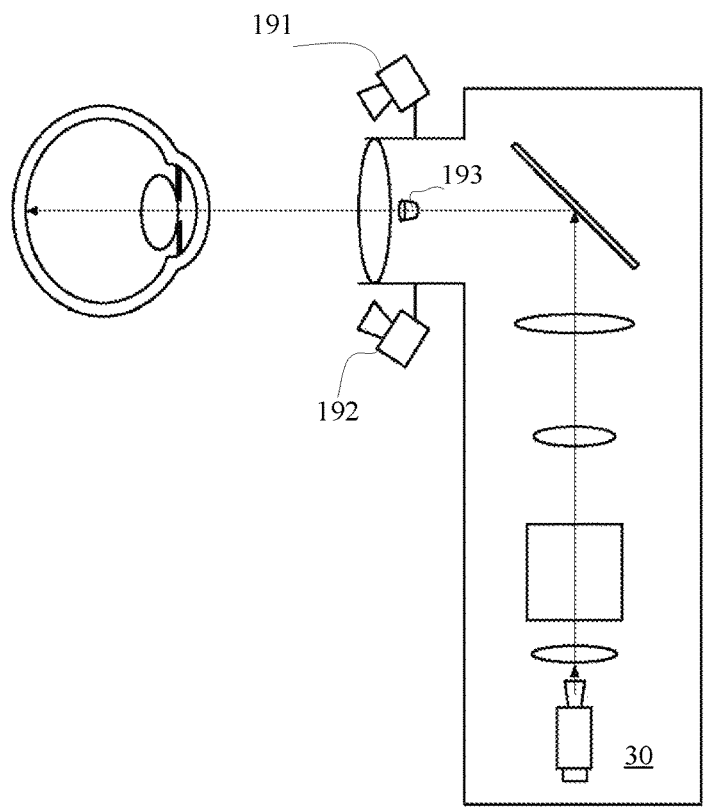
FIG. 15 is an example of a device.

FIG. 15 Illustrates an embodiment of eye exam device 30 with two small alignment cameras 191 and 192 and light source/s 193.

The auto-align system comprises 2 or more small camera modules at the sides of the optical path to capture the eye and use a method of stereovision to detect and align the main optical path in front of the eye. Also, small illumination modules, can be LEDs, are illuminating the eye to help the alignment camera have good quality imaging of the eye.

It should be noted the description here of eye review device is exemplar, where the tested sample can be anything with an interest to be measured with the device.

The device computer captures images from the alignment cameras, detect the eye or the desired sample object and passes commands to the SL stage for proper alignment. For that purpose, it's well understood the a calibration process needed for the stereo-vision to work properly to accurately make the alignment.

Collection path split to first and second camera:

It may be for some cases the different imaging modalities will require usage of different sensor e.g. one for OCT and the other for spectral imaging. The receive optical path may be split via using beam splitter such that the entire imaging optics will be shared among both sensors. This way size and cost of the device maintains low.

FIG. 16 illustrates an example of a device 30' that differs from device 30 of FIG. 2 by having an additional camera 62' and having another beam splitter 66 that splits the light between camera 62 and additional camera 62'.

Neurodegeneration Detection

Increasing evidence showing that the eye retina may be helpful for neural condition biosensing and provide bioindication of neuronal degradation of the brain. Dementia diseases like Alzheimer Disease (AD) exhibit neuronal degradation long before clinical indication is evident, currently MRI, PET and Cerebrospinal fluid (CSF) tests are being used for neuropathology detection, but these methods are having sensitivity and specificity issues. There is no accurate biosensing available at present days for the early signs of these diseases.

Having a reliable detection non-invasive and commonly available tests to the Neurologist once they examine the patients have a huge potential. Another aspect of need for neurodegeneration detection is treatments of new drugs administration in the field. These new drugs need a reliable tracking over the progress of the disease related features. In the process of approval, the drug companies need to perform trials over large quantity of people and since the nature of the disease progress measured in years the trial time is long, during this time the people participating in the trial need to be routinely monitored. Thus, a need for widespread easy to use testing device and system is needed for tracking over disease progress, disease related features such as the retina neural layer thickness and other such measures can be registered over time and provide critical data for effect of the drug treatment.

The neurodegeneration expression of dementia in the brain activity may be expressed in different measures like Electroencephalogram (EEG), magnetoencephalography (MEG), or Functional Near-Infrared Spectroscopy (FNIRS) see [12], that sensing the brain activity over time. Patients are given a task to perform and the brain activity during the task is measured. Both EEG and FNIRS are simple, easy to use and can be widespread easily.

A wide point of view on this subject matter is showing many methodologies that give indication for neurodegeneration but there is no complete and reliable solution for bio-indication that is also low-cost, simple and widespread.

There is provided a solution for bio-indication that is also low-cost, simple and widespread—and capable of collecting data from patients using variety of sensing modalities. Each modality may have a Sensitivity and Specificity measures that might not be sufficient stand alone, however the combination of multiple measures may provide complementary measures for obtaining a reliable result of Sensitivity and Specificity.

Figure 17:
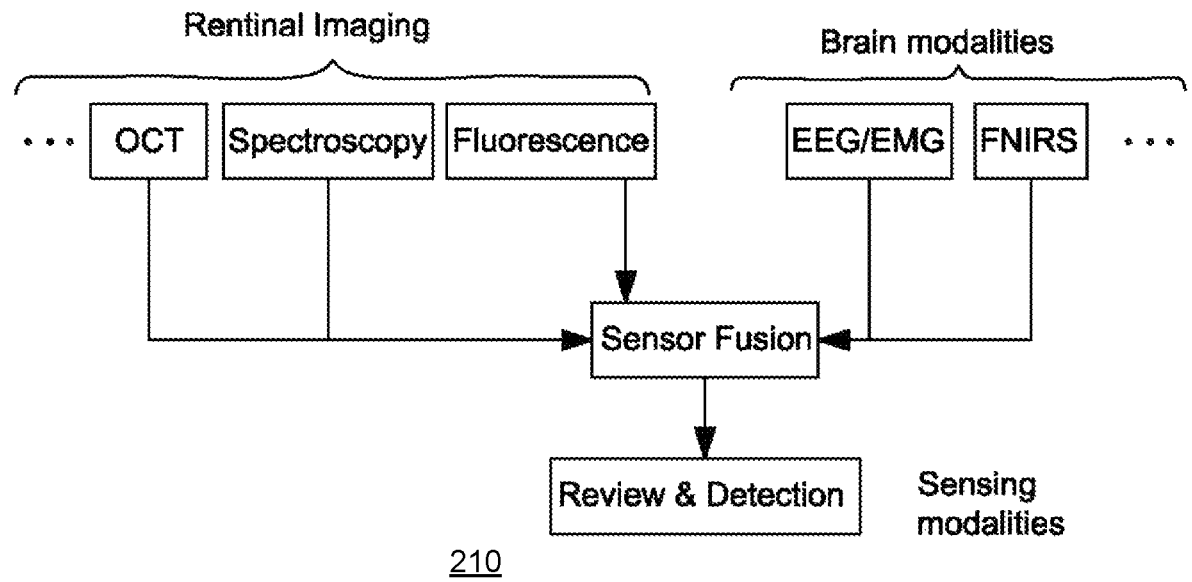
FIG. 17 illustrates an example of a device for neurodegeneration detection and tracking.

FIG. 17 illustrates a device 210 for neurodegeneration detection and tracking combining retinal imaging modalities such as OCT and fluorescence with brain sensing modalities all the modalities have been shown in the literature as having an indication to serve as bio-indication for Dementia such as AD before clinical indication but not sufficient as stand-alone test. It's the understanding of collaboration of many modalities may get the desired results.

Multiple sensing modalities data combined together in the Sensor Fusion block for coordination of temporal registration between modalities, also for regional information in the retina modalities data. Giving solid and wide basis for further pattern detection for detection and review by experts. The capture of data my accompanied by administration of bio-indicative agents to the patients prior to the test. Such as Curcumin. Curcumin, or diferuloylmethane, exhibits an affinity for Amyloid Beta (Aβ) aggregates. Curcumin is a food constituent and considered to be safe for administration. Curcumin and its conjugates bind to β-pleated sheets of Aβ, as well as its oligomers, fibrils and plaques. More recently, the fluorescence imaging of amyloid deposits using curcumin-Aβ interactions has been applied to image Aβ deposits in the retina. Where Aβ accumulation in the brain is one of AD signs.

Widespread Distributed Data Collection and Cloud Usages.

Figure 18:
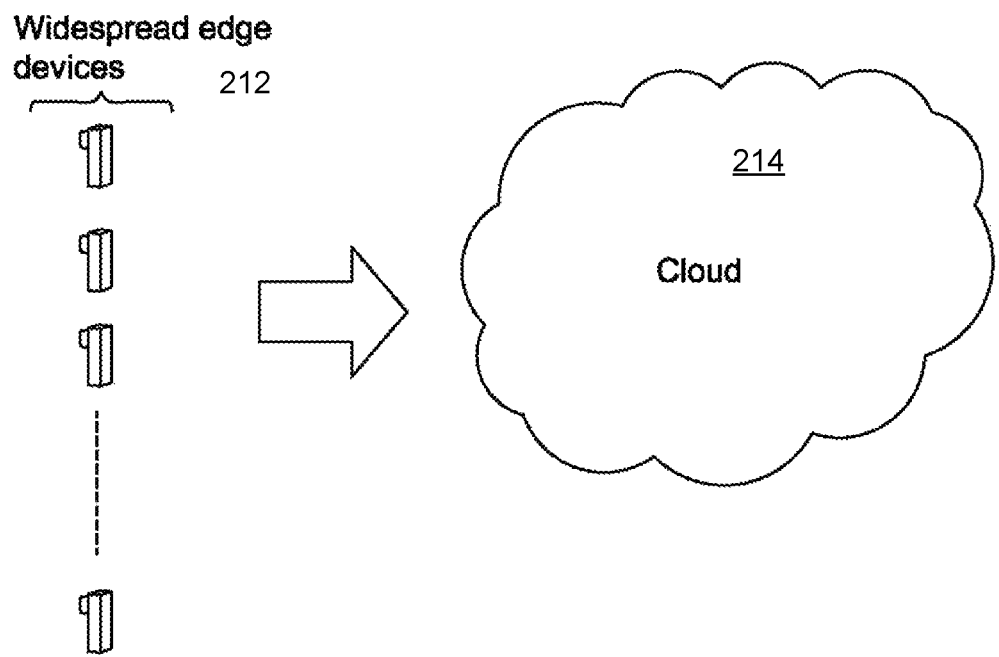
FIG. 18 illustrates an example of a widespread data collection from edge devices into code.

One of the reasons there is no widespread reliable bio-indication of neurodegeneration process in the brain and early bio-indication for dementia is the lack of measurements of people over time when the neurodegeneration process progresses since the disease diagnosis done long after process starts. There is provided a method for constructing an infrastructure for data collecting at large scale that will provide means for diagnosis development, monitoring over time, data sharing, review treatment monitoring and AI based indication alarms for possible Dementia disease. FIG. 18 illustrates a widespread data collection 212 from edge devices into clude. Providing means for storage treatment proofing and diagnosis development. The figure illustrates the structure of widespread network of data collection involving the distribution of edge devices in clinics around the world. These edge devices, as described above would capture retina and other brain related information. All described above, thus no need to repeat here. The data collection may be implemented in a cloud service 214 such as AWS. This vast collection of data will be used for many services such safe and secured storage, sharing with experts, routine data collection from patient enabling progress tracking of disease related features. Diagnosis services offering. And new diagnosis development once the data collection quantity will be large and enable Machine Learning (ML) method such as AI based learning tools to offer reliable diagnosis. Furthermore, over time it would be expected that some of the monitored people will get eye disease or dementia, the fact that the persons data over time that precedes the diagnostics of the disease will further enhance the ML capability to provide reliable diagnostics.

Figure 19:
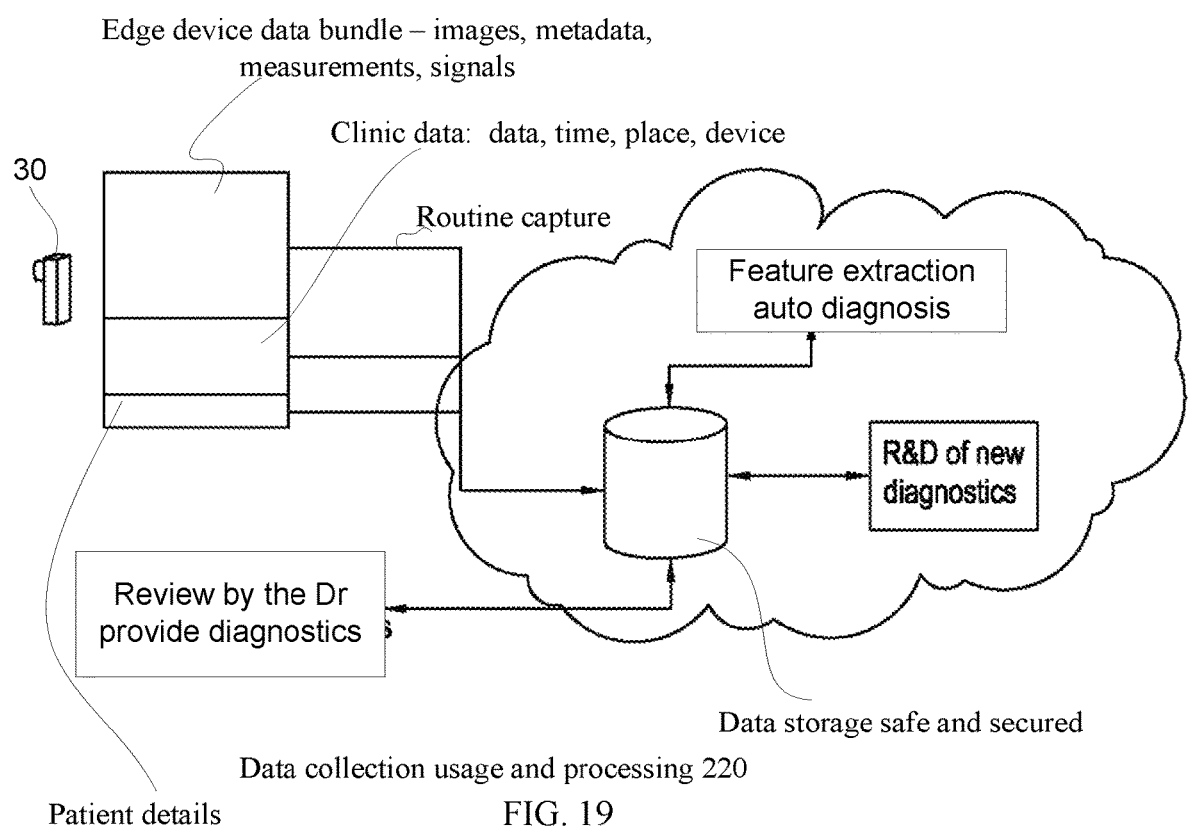
FIG. 19 illustrates an example of a data management in the database.

FIG. 19 illustrates data management 220 in the database. That may be a cloud service. Collected data from edge devices containing retina imaging and other sensing modalities is uploaded into storage. The data should incorporate details of the tested person such as age, gender and other relevant information including its health history. Also, the time and place, the capturing device and any other relevant information.

The collected data is being saved in a repository that is safe and secured according to the relevant standards in the health field to ensure its safety and security. The storage management should allow for authorized persons such as the person's Dr' or an expert in the field to review and make his diagnostics. The Dr' may review all relevant data including past data over time, thus the Dr' may update the diagnostics back to the repository.

Also, the storage may enable an analysis tool to extract additional features from the data such as the fluorescence level and area captured in the retina imaging, or how the OCT imaging is indicative to AD.

The extracted features and the raw data may be available to diagnostic program to inspect the persons data and features and provide its suggested diagnostic back to the storage and alarm the Dr' or its results. Note this tool do not be exposed to person's private data. Thus, no worry of patients privacy inference. As a result, these diagnostic tools may be offered by third party such as a private company or a health institute, these third-party diagnostics providers will need authorization and should follow standards of safety and security as wel such that the information will not leek to not authorized users.

The aggregated data collected over time of many people would become the basic building blocks for further innovative ML based new diagnostics that would be developed as the repository grow in time. In the beginning the diagnosis will provide features measurements and some likelihood of diseases of the eye or dementia, but in time, as the data will include true diagnostics from clinical trials or other diagnostics tools such as PET the ML-based diagnostics would improve sensitivity and specificity up the high confidence level of early onset bio-indication.

One more service the system can provide is monitoring over the performance of new drugs. People participating in a trial of new drugs for dementia such as AD or an eye disease are monitored repeatedly with this system, the data storage is marked accordingly, and analysis tools are applied over the measured features to see if the indications of disease progress improve. This system widespread, ease of use and availability is actually enabling the fast and efficient of new drugs introduction on the fields of Neurology and Ophthalmology.

Abbreviations.
OCT—Optical coherence tomography.
TD-OCT—Time Domain OCT.
SD-OCT—Spectral Domain OCT.
FF-OCT—Full Field OCT.
SS-OCT—Swept Source OCT.
FF-SS—OCT Full Field SS-OCT
FF-TD-OCT—Full Field TD-OC
TOF—Time Of Flight.
SLD—Super-Luminescent Diode
AO—Adaptive Optics.
AD—Alzheimer Disease.
PD—Photodiode.
FFT—Fast Fourier Transform.
CNS—Central Nervous System.
CSF—Cerebrospinal fluid.
AMD Age—related Macular Degeneration.
NA—Numerical Aperture.
DOF—Depth of Focus.
SL—Slit Lamp.
FLIO—Fluorescence Lifetime Imaging Ophthalmoscopy.
FLIM—Fluorescence Lifetime Imaging Microscopy.
CFA—Colour Filter Array.
SL—Slit-Lamp.
EEG—Electroencephalogram.
FNIRS—Functional Near-Infrared Spectroscopy.
Aβ—Amyloid Beta.
ML—Machine Learning
IRF—Instrument Response Functions
TCSPC—Time-Correlated Single Photon Counting The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein. The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any reference to "comprising" should be applied, mutatis mutandis, to "consisting essentially of".

Any reference to "comprising" should be applied, mutatis mutandis, to "consisting".

I claim:

1. A method for optical coherence tomography (OCT), the method comprising:
   performing a plurality of measurement sessions; wherein different measurement sessions are associated with different optical paths lengths of a reference arm of an interferometer;
   wherein a measurement session that is associated with a given optical path length of the different optical paths lengths comprises:
      performing measurement iterations, wherein each measurement iteration comprises:

illuminating a sample by radiation that passes through a sensing arm of the interferometer;

phase modulating of the radiation that propagates within an arm of the interferometer, wherein the arm is selected out of the sensing arm and a reference arm, wherein the phase modulation has a modulation cycle;

merging radiation that exits the reference arm with radiation from the sensing arm that returned from a sub-region of a sample to provide an interference pattern;

generating signals indicative of the interference pattern by two dimensional (2D) arrays of sensing related elements of a sensing unit, wherein different 2D arrays of sensing related elements sample the interference pattern at different detection periods within the measurement iteration; wherein a duration of each one of the detection periods is a fraction of the modulation cycle; and aggregating, by the sensing unit, signals obtained by each one of the sensing related elements during the measurement iterations to provide measurement session results.

2. The method according to claim 1, wherein a sensing related element is a radiation detector.

3. The method according to claim 1, wherein a sensing related element is charge accumulator that is preceded by a radiation detector that is in communication, via a charge distribution circuit, with the charge accumulator and one or more additional charge accumulator.

4. The method according to claim 1, wherein a duration of a measurement session does not exceed 1 milliseconds.

5. The method according to claim 1, wherein a depth of the sub-region corresponds to the given optical path length of the reference arm.

6. The method according to claim 1, comprising processing measurement session results of the plurality of measurement sessions to provide three dimensional (3D) information about the sample.

7. The method according to claim 6, wherein the processing comprises registering measurement session results of different sessions.

8. The method according to claim 7, wherein the registering comprises lateral position compensation.

9. The method according to claim 6, wherein the processing comprises contrast optimization.

10. The method according to claim 1, comprising changing a focusing position of the sensing arm and preforming another plurality of measurement sessions.

11. The method according to claim 10, wherein a depth of the sub-region corresponds to the given optical path length of the reference arm and to the focusing position of the sensing arm.

12. The method according to claim 10, wherein interference patterns obtained during the plurality of measurement sessions are indicative of a first layer of the sample, wherein interference patterns obtained during the other plurality of measurement sessions are indicative of a second layer of the sample; wherein the first layer is associated with a first depth range and the second layer is associated with a second depth range that differs from the first depth range.

13. The method according to claim 10, wherein interference patterns obtained during the plurality of measurement sessions are indicative of a first segment of the sample, wherein interference patterns obtained during the other plurality of measurement sessions are indicative of a second segment of the sample; wherein the first segment is associated with a first height range and the second segment is associated with a second height range that differs from the first height range.

14. The method according to claim 10, wherein the changing of the focusing position of the sensing arm occurs along an optical path length change of the reference arm.

15. The method according to claim 1, wherein the OCT is executed in vivo.

16. The method according to claim 1, comprising processing measurement session results from at least some of the plurality of measurement sessions to provide three dimensional information about the sample.

17. The method according to claim 16, wherein the processing comprises aligning measurement session results from the at least some of the plurality of measurement sessions.

18. The method according to claim 1, wherein the duration of each one of the detection periods is determined based on a phase modulation frequency and a rate of change of the reference arm optical paths lengths.

19. The method according to claim 1, wherein a sensing related element is radiation detector that is followed by a charge accumulator.

20. A device for optical coherence tomography (OCT), the device comprising:
an interferometer;
a radiation source;
a phase modulator;
a sensing unit that comprises two dimensional (2D) arrays of sensing related elements; and
a controller that is configured to control a performing of a plurality of measurement sessions; wherein different measurement sessions are associated with different optical paths lengths of a reference arm of an interferometer;
wherein during a measurement session that is associated with a given optical path length of the different optical paths lengths, the OCT device is configured to perform measurement iterations, wherein for each measurement iteration:
the interferometer is configured to illuminate a sample by radiation that is generated by the radiation source and passes through a sensing arm of the interferometer;
the phase modulator is configured to phase modulate the radiation that propagates within an arm of the interferometer, wherein the arm is selected out of the sensing arm and a reference arm, wherein the phase modulation has a modulation cycle;
the interferometer is also configured to merge radiation that exits the reference arm with radiation from the sensing arm that returned from a sub-region of a sample to provide an interference pattern; and
wherein the sensing unit is configured to:
generate signals indicative of the interference pattern by a 2D array of sensing related elements, wherein different 2D arrays of sensing related elements sample the interference pattern at different detection periods within the measurement iteration; wherein a duration of each one of the detection periods is a fraction of the modulation cycle; and
aggregate signals obtained by each one of the sensing related elements during the measurement iterations to provide measurement session results.

21. The device according to claim 20, wherein a sensing related element is a radiation detector.

22. The device according to claim 20, wherein a sensing related element is charge accumulator that is preceded by a radiation detector that is in communication, via a charge distribution circuit, with the charge accumulator and one or more additional charge accumulator.

23. The device according to claim 20, wherein a duration of a measurement session does not exceed 1 milliseconds.

24. The device according to claim 20, wherein a depth of the sub-region corresponds to the given optical path length of the reference arm.

25. The device according to claim 20, comprising a processing circuit that is configured to process measurement session results of the plurality of measurement sessions to provide three dimensional (3D) information about the sample.

26. The device according to claim 25, wherein the processing circuit is configured to register measurement session results of different sessions.

27. The device according to claim 26, wherein the registering comprises lateral position compensation.

28. The device according to claim 25, wherein the processing circuit is configured to perform contrast optimization.

29. The device according to claim 20, wherein the controller is configured to control a change of a focusing position of the sensing arm; and wherein the OCT device is configured to preform another plurality of measurement sessions.

30. The device according to claim 29, wherein a depth of the sub-region corresponds to the given optical path length of the reference arm and to the focusing position of the sensing arm.

31. The device according to claim 29, wherein interference patterns obtained during the plurality of measurement sessions are indicative of a first layer of the sample, wherein interference patterns obtained during the other plurality of measurement sessions are indicative of a second layer of the sample; wherein the first layer is associated with a first depth range and the second layer is associated with a second depth range that differs from the first depth range.

32. The device according to claim 29, wherein interference patterns obtained during the plurality of measurement sessions are indicative of a first segment of the sample, wherein interference patterns obtained during the other plurality of measurement sessions are indicative of a second segment of the sample; wherein the first segment is associated with a first height range and the second segment is associated with a second height range that differs from the first height range.

33. The device according to claim 29, wherein the changing of the focusing position of the sensing arm occurs along an optical path length change of the reference arm.

34. The device according to claim 20, wherein the OCT is executed in vivo.

35. The device according to claim 20, comprising a processing circuit that is configured to process measurement session results from at least some of the plurality of measurement sessions to provide three dimensional information about the sample.

36. The device according to claim 35, wherein the processing circuit is configured to align measurement session results from the at least some of the plurality of measurement sessions.

37. The device according to claim 20, wherein the duration of each one of the detection periods is determined based on a phase modulation frequency and a rate of change of the reference arm optical paths lengths.

38. The device according to claim 20, wherein a sensing related element is a radiation detector that is followed by a charge accumulator.

* * * * *